(12) United States Patent
Nishikawa et al.

(10) Patent No.: US 6,919,388 B2
(45) Date of Patent: Jul. 19, 2005

(54) CEMENT ADMIXTURE AND CEMENT COMPOSITION

(75) Inventors: Tomotaka Nishikawa, Suita (JP); Hirokatsu Kawakami, Izumiotsu (JP); Daisuke Imai, Himeji (JP); Hiromichi Tanaka, Toyonaka (JP); Tsuyoshi Hirata, Kobe (JP); Tsutomu Yuasa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 28 days.

(21) Appl. No.: 10/110,271

(22) PCT Filed: Jun. 27, 2001

(86) PCT No.: PCT/JP01/05529

§ 371 (c)(1),
(2), (4) Date: May 24, 2002

(87) PCT Pub. No.: WO02/14237

PCT Pub. Date: Feb. 21, 2002

(65) Prior Publication Data

US 2003/0087993 A1 May 8, 2003

(30) Foreign Application Priority Data

Aug. 11, 2000 (JP) ........................................ 2000-244650
Aug. 11, 2000 (JP) ........................................ 2000-244816

(51) Int. Cl.$^7$ ............................ C04B 24/32; C08K 5/06
(52) U.S. Cl. ................ 524/4; 524/5; 524/376; 524/377; 560/189; 560/205; 560/224; 106/724; 106/727
(58) Field of Search .................. 524/4–5, 376–377; 560/189, 205, 224, 274; 106/724, 727

(56) References Cited

U.S. PATENT DOCUMENTS

| 3,405,085 | A |   | 10/1968 | Girg et al. |
| 5,661,206 | A | * | 8/1997 | Tanaka et al. ............... 524/378 |
| 5,912,284 | A | * | 6/1999 | Hirata et al. .................... 524/5 |
| 5,925,184 | A | * | 7/1999 | Hirata et al. ................. 106/696 |
| 6,087,418 | A | * | 7/2000 | Yamashita et al. .............. 524/5 |
| 6,166,112 | A | * | 12/2000 | Hirata et al. .................... 524/5 |
| 6,174,980 | B1 | * | 1/2001 | Hirata et al. ................. 526/320 |
| 6,294,015 | B1 | * | 9/2001 | Yamashita et al. .......... 106/802 |
| 6,545,083 | B1 | * | 4/2003 | Hirata et al. ................. 524/556 |

FOREIGN PATENT DOCUMENTS

| DE | 10048139 A1 | 4/2001 |
| EP | 1 041 053 A1 | 4/2000 |
| EP | 1 103 570 A2 | 5/2001 |
| JP | 43-11114 | 5/1943 |
| JP | 63-11557 | 1/1988 |
| JP | 4-2641 A | 1/1992 |
| JP | 7-53249 A | 2/1995 |
| JP | 7-157349 | 6/1995 |
| JP | 7-215746 A | 8/1995 |
| JP | 7-232945 A | 9/1995 |
| JP | 10-236857 | 9/1998 |
| JP | 2000-016849 A | 1/2000 |
| JP | 2000-226246 A | 8/2000 |
| JP | 2000-256049 A | 9/2000 |
| JP | 2000-319054 A | 11/2000 |
| JP | 2001-106559 | 4/2001 |
| JP | 2001-192250 A | 7/2001 |
| JP | 2001-220417 A | 8/2001 |
| WO | WO 01/42161 A2 | 6/2001 |

OTHER PUBLICATIONS

Australian Search Report of Nov. 11, 2004.

* cited by examiner

*Primary Examiner*—Peter Szekely
(74) *Attorney, Agent, or Firm*—Sughrue Mion, PLLC

(57) ABSTRACT

The admixtures for a cementitious composition of the invention, which have the above-mentioned constitutions, can suitably be used in cement pastes, mortar, concrete and like cement compositions and can stabilize the amount of air entrained with the lapse of time and thus facilitate the quality control of cement compositions and, further, can improve the workability of cement compositions owing to their excellent dispersing capacities. The cement compositions of the invention which comprise such admixture for a cementitious composition are excellent in water-reducing ability and workability and can give hardened products excellent in strength and durability and, further, can stably maintain the amount of air entrained without allowing increases in the amount of air even when the time of kneading is prolonged in the production.

20 Claims, 2 Drawing Sheets

CEMENT ADMIXTURE AND CEMENT COMPOSITION

This is a National stage entry under 35 U.S.C. § 371 of PCT Application Serial No. PCT/JP01/05529 filed Jun. 27, 2001; the above noted application is hereby incorporated by reference.

TECHNICAL FIELD

The present invention relates to a cement additive, an admixture for a cementitious composition and a cement composition. More particularly, it relates to a cement additive showing antifoaming properties, an admixture for a cementitious composition comprising said cement additive, a an admixture for a cementitious composition comprising a water-soluble polymer and an antifoaming agent, an admixture for a cementitious composition comprising a water-soluble polymer and water, and a cement composition comprising such admixture for a cementitious composition, cement and water.

BACKGROUND ART

Cement compositions give concrete and other hardening products excellent in strength and durability and, therefore, are used widely in such fields of application as outer walls of buildings and architectural structures. Such cement compositions generally contains an admixture for a cementitious composition so that the air entraining properties and fluidity thereof may be enhanced. In recent years, the importance of admixtures for a cementitious composition has been recognized and a number of technological innovations have been made. The admixture for a cementitious composition plays a role in securing the fluidity and workability of a cement composition by exhibiting its dispersing ability even when the water content in the cement composition is reduced, in realizing improvements in durability and strength owing to water reduction and in providing a good cement composition with retained dispersibility not changing with time.

In the recent concrete industry, it is strongly demanded that concrete structures have improved durability and strength. Accordingly, reduction of the unit water content in cement compositions is now an important subject. In particular, a large number of polycarboxylic acid cement dispersants have been investigated since higher water reducing ratios can be attained with them as compared with the conventional cement dispersants of naphthalene and the like. The use of such a polycarboxylic acid-based cement dispersant can lead to increase in air entraining properties and in bubble size. Thus, for improving the freeze-thaw resistance by means of entrainment of minute bubbles of good quality, it is used in combination with an air-entraining (AE) agent.

However, it is a drawback with the combined use of a polycarboxylic acid cement dispersant and an AE agent that the amount of air entrained progressively increases as concrete kneading is continued and this makes it difficult to attain the desired concrete strength. The conventional antifoaming agents are indeed effective in temporarily reducing the amount of air entrained but, in this case, too, continued kneading allows the amount of air entrained to increase progressively. In view of the on-site workability, it is difficult to add an antifoaming agent just prior to placing concrete and, therefore, it is required that an antifoaming agent be added in the production of concrete. In the United States, in particular, the addition of an AE agent is essential as a measure to cope with the problems arising from freezing and thawing and, furthermore, the increase in the amount of air entrained is a serious problem since kneading is continued for a long period of time during transportation.

SUMMARY OF THE INVENTION

It is an object of the present invention made in view of the above-mentioned state of the art to provide a cement additive which causes no increase in the amount of air and can thus stably maintain the amount of air entrained even when the time of kneading is prolonged in the production of cement compositions. A further object is to provide an admixture for a cementitious composition having such air entraining properties and having a high level of water-reducing capacity as well as a cement composition.

In the course of their investigations concerning various cement additives and admixtures for a cementitious composition, the present inventors found that a cement additive having a chemical structure such that it undergoes hydrolysis under alkaline conditions and thus exhibits antifoaming properties with the lapse of time can stably show its antifoaming capacity while preventing association in salt water, such as in concrete, and maintaining uniform dispersion with the lapse of time. Such a cement additive can suitably be used as an antifoaming agent having controlled release in cement compositions. The preferred controlled release antifoaming agent, for example, has a structure having both a hydrophobic group and a hydrophilic group, such as carboxyl, with the hydrophilic group being bound through an ester bond or an amide bond, and, as such, remains to be hydrophilic before hydrolysis due to the hydrophilic group but becomes hydrophobic as the ester bond or amide bond moiety is cleaved with the lapse of time in salt water which is alkaline to thereby express antifoaming properties. Further, the inventors first paid their attention to the fact that an admixture for a cementitious composition comprising a water-soluble polymer (C) and an antifoaming agent (B) makes it possible to express water-reducing capacity and at the same time control the amount of air entrained. Then, they realized that when certain properties of the antifoaming agent (B) and the content thereof are properly selected, a high water-reducing capacity can be attained and the amount of air entrained be maintained steady without allowing increases in the amount of air even when the time of kneading is prolonged in the production of cement compositions and, accordingly, the problems mentioned above can successfully be solved. Such an antifoaming agent (B) is characterized in that it is very weak in antifoaming capacity in aqueous medium solutions but, in aqueous medium solutions containing an inorganic salt(s) and/or an organic salt(s), its antifoaming capacity is manifested. With the admixtures for a cementitious composition in which the conventional antifoaming agents are used, the antifoaming agents undergo aggregation and/or salting out in salt water, such as concrete, because the association of hydrophobic group occurs due to the high hydrophobicity of the antifoaming agents, with the result that the antifoaming agents are localized and the antifoaming capacities are thereby reduced. On the contrary, the antifoaming agent (B) in the above-mentioned admixture for a cementitious composition is hydrophilic and, therefore, its association is suppressed and, in salt water, it supposedly undergoes a slight salting out effect, whereby its hydrophilicity decreases and its antifoaming capacity is manifested; thus it shows stable antifoaming properties.

Furthermore, the inventors found that when an admixture for a cementitious composition comprising a water-soluble polymer and water satisfies all of four requirements, namely two requirements in specific foaming index evaluation, one concerning the cloud point and one concerning a viscosity characteristic, the above problems can successfully be solved and that a cement composition having not more than 100% of the percentage of increase in the amount of air entrained relative to the initial amount of air entrained is excellent in such characteristics as freeze-thaw resistance and is thus useful. Base on these findings, the present invention has now been completed.

The present invention thus provides a cement additive comprising a compound (A) represented by the following general formula (1);

(1)

in the formula, X represents —CO— or —CH$_2$CH$_2$NHCO—, R$^1$ represents a hydrocarbon group containing 1 to 30 carbon atoms, the n R$^2$O groups may be the same or different and each represents an oxyalkylene group containing 2 to 18 carbon atoms, n represents the average molar number of addition of the oxyalkylene group and is an integer of 1 to 300 and R$^3$ represents a group having at least one carboxyl or sulfonyl group or a salt thereof.

The present invention also provides an admixture for a cementitious composition comprising a water-soluble polymer(C) and the above cement additive.

The invention further provides an admixture for a cementitious composition comprising a water-soluble polymer (C) and an antifoaming agent (B), wherein said antifoaming agent (B) has a kaolin turbidity of not more than 500 mg/L as measured in a 1% by weight aqueous medium solution, a cloud point of not lower than 5° C. as measured in a 0.5% by weight aqueous medium solution and an antifoaming capacity in salt water, and wherein the content of said antifoaming agent (B) is not more than 10 times relative to said water-soluble polymer (C) on the weight basis.

The invention further provides an admixture for a cementitious composition comprising a water-soluble polymer (C) and water, wherein a foam height obtainable by causing a calcium chloride-containing aqueous medium solution of said admixture for a cementitious composition to foam is not higher than 70% of the foam height obtainable by causing an aqueous medium solution of said admixture for a cementitious composition to foam, percentage of foam height disappearance 5 minutes after causing the calcium chloride-containing aqueous medium solution of said admixture for a cementitious composition to foam is not less than 50%, a cloud point of a 20% by weight aqueous medium solution of said admixture for a cementitious composition is not lower than 5° C., and a viscosity of a calcium carbonate slurry prepared by adding an aqueous medium solution of said admixture for a cementitious composition to calcium carbonate and adjusting the content of said admixture for a cementitious composition to 0.2% by weight relative to calcium carbonate and the content of calcium carbonate to 70% by weight is not higher than 1,000 mPa·s.

The invention still further provides a cement composition comprising said admixture for a cementitious composition, cement and water.

Lastly, the invention provides a cement composition comprising an admixture for a cementitious composition, cement and water, wherein percentage of increase in an amount of air entrained after 10 minutes of kneading is not more than 100% relative to an initial amount of air entrained.

DETAILED DESCRIPTION OF THE INVENTION

In the following, the present invention is described in detail.

The cement additive of the invention comprises a compound (A) represented by the above general formula (1). Such cement additive may be composed of the compound (A) alone or may contain another or other constituents. It is preferred, however, that it comprises the compound (A) as the main constituent.

Referring to the above general formula (1), R$^1$ is a hydrocarbon group containing 1 to 30 carbon atoms, preferably 2 to 30 carbon atoms, more preferably 4 to 30 carbon atoms, still more preferably 6 to 22 carbon atoms, especially preferably 8 to 22 carbon atoms. It is most preferably a hydrocarbon group containing 10 to 18 carbon atoms. Particularly preferred among hydrocarbon groups are straight or branched alkyl and alkenyl groups. The number of carbon atoms in the oxyalkylene group R$^2$O is appropriately 2 to 18, preferably 2 to 8, more preferably 2 to 4. Furthermore, the moiety —(R$^2$O)$_n$— is preferably composed of an oxyethylene group(s) and an oxyalkylene group(s) containing 3 to 18 carbon atoms, more preferably of an oxyethylene group (s) and an oxyalkylene group(s) containing 3 to 8 carbon atoms, most preferably of an oxyethylene group(s) and an oxyalkylene group(s) containing 3 or 4 carbon atoms. In this case, the moiety —(R$^2$O)$_n$— takes the form of an addition product derived from two or more alkylene oxide species.

In the present specification, the mode of addition, in the addition product, of the two or more alkylene oxide species selected from among ethylene oxide, propylene oxide, butylene oxide, styrene oxide and the like may be any of, random addition, block addition, or alternating addition, for instance. Among the cases where two or more oxyalkylene group species are involved in the above addition, those cases are preferred in which the alkoxyl group represented by R$^1$—O— in the general formula (1) is bound to an oxyethylene group block, which is in turn bound to a block of oxyalkylene groups containing 3 or more carbon atoms.

The average molar number n of addition of the oxyalkylene group(s) in the above-mentioned general formula (1) is an integer of 1 to 300, preferably 2 to 200, more preferably 5 to 100, still more preferably 5 to 50, particularly preferably 5 to 40, most preferably 10 to 40. In the present specification, the average molar number of addition means the mean value of molar numbers of addition of the above-mentioned organic group in each mole of one and the same repeating unit among the polymer-constituting repeating units.

The above compound (A) is preferably a compound represented by the following general formula (2);

(2)

in the formula, R$^1$ represents an alkyl or alkenyl group each containing 6 to 22 carbon atoms, p and q each represents the average molar number of addition and is a number satisfying the relations 2<(p+q)<300 and 0.2<p/(p+q)<0.8 and R$^3$ represents a group having at least one carboxyl or sulfonyl group or a salt thereof.

Referring to the above general formula (2), ethylene oxide (C$_2$H$_4$O) and propylene oxide (C$_3$H$_6$O) occur in the mode of random addition, block addition or alternating addition, for instance and the molar number p of addition of ethylene oxide and the molar number q of addition of propylene oxide preferably satisfy the relation 2<(p+q)<300, more preferably 5<(p+q)<200, still more preferably 5<(p+q)<100, further more preferably 5<(p+q)<50, particularly preferably 5<(p+q)<40, most preferably 10<(p+q)<40, as well as the relation 2<q<30. The ratio of the molar number p of addition of ethylene oxide to the total number (p+q) of addition of the alkylene oxides preferably satisfies the relation 0.2<p/(p+q)<0.8, more preferably 0.3<p/(p+q)<0.7, still more preferably 0.35<p/(p+q)<0.7.

In the above compound (A), $R^3$ in the above general formula (1) is preferably a dicarboxylic acid residue. The dicarboxylic acid residue means a group having a structure remaining after removal of one of the two carboxyl groups of a dicarboxylic acid. Such $R^3$ is preferably one represented by the following general formula (3) or the following general formula (4);

$$—CH=CH—COOY^1 \quad (3)$$

$$—CH_2—CH_2—COOY^2 \quad (4)$$

In the above formulae, $Y^1$ and $Y^2$ each represents a hydrogen atom, a monovalent metal, a divalent metal, ammonium or a protonated organic amine.

Preferred embodiments of the above compound (A) are, for example, (1) compounds resulting from an alkoxy(poly)alkylene glycol produced by addition of 1 to 300 moles of an alkylene oxide(s) to an alcohol having a hydrocarbon group containing 1 to 30 carbon atoms and a compound having two or more carboxyl groups by ester bonding with at least one carboxyl group retained, (2) compounds derived from such an alkoxy(poly)alkylene glycol as mentioned above and a compound having a carboxyl group(s) and a sulfonyl group(s) by ester bonding with at least one sulfonyl group retained, (3) compounds derived from an alkoxy(poly)oxyalkyleneamine terminated in a hydrocarbon group containing 1 to 30 carbon atoms and having an average molar number of addition of the alkylene oxide(s) of 1 to 300 and a compound having two or more carboxyl groups by amide bonding with at least one carboxyl group retained, and (4) compounds derived from such an alkoxy(poly)oxyalkyleneamine as mentioned above and a compound having a carboxyl group(s) and a sulfonyl group(s) by amide boding with at least one sulfonyl group retained. In such compounds (A), the retained carboxyl group(s) or sulfonyl group(s) may be various metal salts, for example the sodium salt or calcium salt resulting from neutralization with a base such as sodium hydroxide or calcium hydroxide, ammonium salts, amine salts and so forth.

The alcohol having a hydrocarbon group containing 1 to 30 carbon atoms, which is to be used in synthesizing the above compound (A) includes straight or branched saturated alcohols such as methanol, ethanol, propanol, isopropanol, butanol, pentanol, hexanol, octanol, lauryl alcohol, cetyl alcohol, stearyl alcohol and other straight or branched alcohols containing 12 to 14 carbon atoms; and unsaturated alcohols such as 3-methyl-3-buten-1-ol, 3-methyl-2-buten-1-ol, 2-methyl-3-buten-2-ol and oleyl alcohol, etc.

As the above compound having two or more carboxyl groups, there may be mentioned unsaturated dicarboxylic acids such as maleic acid, fumaric acid, phthalic acid and itaconic acid, and metal salts, ammonium salts and amine salts thereof; saturated dicarboxylic acids such as succinic acid, malonic acid, glutaric acid and adipic acid, and metal salts, ammonium salts and amine salts thereof; low-molecular-weight polymers of an unsaturated monocarboxylic acid or unsaturated dicarboxylic acid, such as acrylic acid oligomers, methacrylic acid oligomers and maleic acid oligomers, and metal salts, ammonium salts and amine salts thereof; and so forth. Those unsaturated dicarboxylic acids and saturated dicarboxylic acids which give dicarboxylic acid residues $R^3$ are preferred among these, and maleic acid or succinic acid and metal salts, ammonium salts and amine salts thereof are particularly preferred.

The compound (A) in which the above $R^3$ is the residue of maleic acid, succinic acid or a like dicarboxylic acid can be obtained, for example, by reacting a compound resulting from addition of an alkylene oxide(s) to an alcohol with maleic anhydride, succinic anhydride or a like acid anhydride without using any solvent or in an appropriate solvent. On that occasion, an appropriate basic catalyst is preferably used. In addition, the above compound can also be synthesized by subjecting a compound derived from addition of an alkylene oxide(s) to an alcohol and carboxylic acid to esterification or by subjecting a compound derived from addition of an alkylene oxide to an alcohol and an ester compound to transesterification reaction.

The above compound (A) is preferably one in which an ester bond moiety represented by —O—X—, when X is —CO—, or an amide bond moiety in X, when X is —CH$_2$CH$_2$NHCO—, is hydrolyzable under alkaline condition. It is preferred that the hydrolyzate obtainable by hydrolysis of the above compound (A) under alkaline conditions has a higher antifoaming capacity than the antifoaming capacity of the above compound (A) itself. Thus, when the compound (A) is hydrolyzed under alkaline conditions, antifoaming capacity of the resulting hydrolyzate is higher than the antifoaming capacity of the compound (A) before hydrolysis. The comparison in antifoaming capacity between the hydrolyzate obtainable by hydrolysis under alkaline conditions and the compound (A) before hydrolysis can be made by comparing the results of a foaming test by which the capacities of the respective substances to remove bubbles formed by an agent capable of causing foaming (foaming agent) can be evaluated under the same conditions. For example, water, a foaming agent and the above additive are placed in a closable cylindrical glass vessel having a diameter of 4 cm and a height of 10 cm, the vessel is closed, shaken in the vertical direction 20 times at a stroke of 30 cm in 5 seconds and then allowed to stand for 1 minute, and the foaming height is measured. In this manner, the antifoaming capacity (antifoaming ability) comparison can be made. A lower foaming height means a higher antifoaming ability. When the compound (A) according to the invention is tested by this measurement method under alkaline conditions (pH 10 or higher) and under neutral conditions (pH 6 to 8), its antifoaming ability is higher in alkaline conditions.

As the compound capable of serving as the foaming agent mentioned above, use can be made of, for example, polycarboxylic acid cement dispersants, various AE agents of the alkyl ether-based anionic surfactant, modified rosin acid compound-based anionic surfactant, alkylsulfonic acid compound-based anionic surfactant, higher alkylcarboxylic acid salt-based anionic surfactant, or modified alkylcarboxylic acid compound-based anionic surfactant, alkylbenzenesulfonic acid salts, alkylnapthalenesulfonic acid salts, paraffinsulfonic acid salts, higher alcohol sulfate ester salts, higher alkyl ether sulfate ester salts and like anionic, cationic, nonionic and amphoteric surfactants. All of them produce similar foaming effects, and other foaming test methods, such as the falling, stirring, air blowing, and shaking methods, give similar results.

It is preferred that the above compound (A) itself has no antifoaming capacity but the hydrolyzate obtainable by hydrolysis of the above compound (A) under alkaline conditions has the antifoaming capacity. Antifoaming capacity confirmation can be made by the above-mentioned foaming test.

In cases where the above compound (A) is hydrolyzable under alkaline conditions and the antifoaming capacity of the hydrolyzate is higher than that of the compound (A) itself, it is preferred that the compound (A) be hydrolyzable under alkaline conditions in unhardened cement compositions comprising cement and water.

By using an admixture for a cementitious composition comprising a cement dispersant and the above cement additive in accordance with the present invention, concrete or the like always having a stable amount of air entrained can be obtained during kneading of concrete or a like cement composition. This is because the compound (A) in the above-mentioned cement additive is gradually hydrolyzed under alkaline conditions in the concrete or like cement composition and the hydrolyzate higher in antifoaming ability as gradually formed makes the antifoaming effect maintained. Further, when allowed to stand after kneading, concrete or a like cement composition always having a stable amount of air entrained can be obtained. Those conventional substances which are incorporated in cement dispersants as antifoaming components are not readily soluble in water and cause the problem that the antifoaming components separate out, when stored in admixture with cement dispersant solutions. On the contrary, the compound (A) is highly hydrophilic, so that it can occur relatively uniformly in cement dispersant solutions and the mixtures thereof can be stored stably without separation.

Preferably, a cement dispersant comprising the water-soluble polymer(C)is used as the above-mentioned cement dispersant. Thus, in accordance with the present invention, a cement composition having a high water-reducing capacity and capable of showing a stable amount of air entrained can be obtained by using an admixture for a cementitious composition comprising the water-soluble polymer(C)and the above-mentioned cement additive. Such cement additive also constitutes an aspect of the present invention. The ratio, on the solid weight basis, between the cement dispersant and compound (A) in such admixture for a cementitious composition, namely the ratio compound (A)/cement dispersant, is preferably 0.005 to 0.3, more preferably 0.01 to 0.25, still more preferably 0.015 to 0.20, most preferably 0.02 to 0.15.

In the above admixture for a cementitious composition, any of various AE agents, such as of the alkyl ether-based anionic surfactant, modified rosin acid compound-based anionic surfactant, alkylsulfonic acid compound-based anionic surfactant, higher alkylcarboxylic acid salt-based anionic surfactant and modified alkylcarboxylic acid compound-based anionic surfactant, for example Vinsol (trademark, product of Yamaso Kagaku) and Micro-Air (trademark, product of Master Builders), may be used combinedly, without reducing the effects of the admixture for a cementitious composition. Furthermore, other concrete admixtures such as cement dispersants other than those of polycarboxylic acid, shrinkage reducing agents, separation reducing agents, neutralization quick setting accelerating agents, accelerators, water-soluble polymers, thickening agents, flocculants, cement wetting agents, and corrosion inhibitors, may be used combinedly, without reducing the effects of the admixture for a cementitious composition. The amount of addition of the above compound (A) is preferably, for example, 0.001 to 1.0% by weight, more preferably 0.001 to 0.5% by weight, still more preferably 0.001 to 0.1% by weight, most preferably 0.001 to 0.05% by weight, based on the weight of cement. The compound (A) may be used a single species or a mixture of two or more species may be used.

An admixture for a cementitious composition comprising a water-soluble polymer(C)and an antifoaming agent (B) in which said antifoaming agent (B) has a kaolin turbidity of not more than 500 mg/L as measured in a 1% by weight aqueous medium solution, a cloud point of not lower than 5° C. as measured in a 0.5% by weight aqueous medium solution and an antifoaming capacity in salt water, and in which the content of said antifoaming agent (B) is not more than 10 times relative to said water-soluble polymer(C)on the weight basis can also produce the effects of the present invention, and such admixture for a cementitious composition constitutes a further aspect of the present invention.

The above admixture for a cementitious composition, in which a kaolin turbidity as measured in a 1% by weight aqueous medium solution and a cloud point as measured in a 0.5% by weight aqueous solution satisfy the above-specified range requirements, can show good compatibility between the water-soluble polymer(C), which is to serve as a cement dispersant, and when prepared in a solid matter concentration of 10% by weight, for instance, the antifoaming agent and can give a uniform aqueous medium solution and show constant and uniform performance characteristics without changing with time and without separation of the antifoaming agent even when stored for a prolonged period of time. Since it has antifoaming properties in salt water, it can effectively exhibit antifoaming capacity under alkaline conditions in concrete and like cement compositions. By saying that it has antifoaming properties in salt water, it is meant that the antifoaming capacity in aqueous medium solutions of an inorganic and/or organic salt(s) is superior to the antifoaming capacity in aqueous medium solution alone. Furthermore, when the content of the antifoaming agent (B) is within the above-specified range, it becomes possible for the antifoaming agent (B) to fully produce its effects. When the content of the antifoaming agent (B) exceeds the above range, the antifoaming effect is lost and the air-entraining effect is conversely produced. These produce synergistic effects and make it possible for the above admixture for a cementitious composition to have a high water reducing capacity and maintain a stable amount of air entrained without allowing increases in the amount of air even when the time of kneading is prolonged in the production of cement compositions.

As regards the above admixture for a cementitious composition, it is preferred, for example, that the kaolin turbidity defined hereinabove be not more than 400 mg/L, and that the above cloud point be 5 to 80° C., more preferably not more than 300 mg/L and 5 to 60° C., still more preferably not more than 200 mg/L and 5 to 50° C., respectively. The content of the antifoaming agent (B) is preferably 0.001 to 10 times, more preferably 0.005 to 5 times, still more preferably 0.01 to 3 times, relative to the amount of the above water-soluble polymer(C)on the weight basis.

As for the methods of measuring the above-mentioned kaolin turbidity and cloud point, the following methods, for instance, are suitably used. That the antifoaming agent in question has antifoaming properties in salt water can be confirmed by the above-mentioned foaming test.

(Kaolin Turbidity Measurement Method)

The sample (antifoaming agent) is placed in a square cell with a thickness of 10 mm and the turbidity (kaolin turbidity:

mg/L) is measured using a turbidimeter (NEC Corporation model NDH2000 (trademark)). In cases where the sample undergoes separation with the lapse of time, it is stirred and, after attaining homogeneity, the measurement is carried out within 10 minutes.

(Cloud Point Measurement Method)
(1) A 0.5% by weight aqueous medium solution of the antifoaming agent is prepared.
(2) The 0.5% by weight aqueous medium solution of the antifoaming agent as prepared as mentioned above under (1) is heated on a water bath, and the temperature at which the aqueous medium solution begins to become cloudy is recorded as the cloud point.

The above antifoaming agent (B) is not particularly restricted but may be any of those compounds capable of reducing the amount of bubbles in aqueous solutions. Preferably, however, the oxyalkylene antifoaming agent (B-1) and/or oxyalkylene antifoaming agent (B-2) which is mentioned below, for instance, is to be contained. In this case, it is preferred that the antifoaming agent (B) be composed of the oxyalkylene antifoaming agent (B-1) and/or oxyalkylene antifoaming agent (B-2) or comprise one or both of these as main constituent(s). The above oxyalkylene antifoaming agent (B-1) is represented by the following general formula (5);

  (5)

in the formula, $R^4$ and $R^6$ are the same or different and each represents a hydrogen atom or a hydrocarbon group containing 1 to 30 carbon atoms, the t $R^5O$ groups are the same or different and each represents an oxyalkylene group containing 2 to 18 carbon atoms, t represents the average molar number of addition of the oxyalkylene group(s) and is a number of 1 to 300, T represents —O—, —$CO_2$—, —$SO_4$—, —$PO_4$— or —NH—, m represents an integer of 1 or 2 and, when $R^4$ is a hydrogen atom, m is 1. In the general formula (5), $R^4$ is a hydrogen atom or a hydrocarbon group containing 1 to 30 carbon atoms, preferably 2 to 30, more preferably 4 to 30, still more preferably 6 to 22, especially preferably 8 to 22, most preferably 10 to 18 carbon atoms. Among the hydrocarbon groups, straight or branched alkyl and alkenyl groups are particularly preferred. The number of carbon atoms in the oxyalkylene group $R^5O$ is adequately 2 to 18, preferably 2 to 8, more preferably 2 to 4. Further, the moiety —$(R^5O)_t$— is preferably composed of an oxyethylene group(s) and an oxyalkylene group(s) containing 3 to 18 carbon atoms, particularly preferably of an oxyethylene group(s) and an oxyalkylene group(s) containing 3 to 8 carbon atoms, most preferably of an oxyethylene group(s) and an oxyalkylene group(s) containing 3 to 4 carbon atoms. In this case, the moiety —$(R^5O)_t$— has a form resulting from addition of two or more alkylene oxide species. In the present specification, the mode of addition of the oxyalkylene groups in the form resulting from addition of two or more alkylene oxide species selected from among ethylene oxide, propylene oxide, butylene oxide, styrene oxide and the like may be any of the random addition, block addition, or alternating addition, for instance. In cases where two or more oxyalkylene group species are involved in the addition, it is preferred that the group $R^6$— in the general formula (5) be bound to an oxyethylene block which in turn be bound to a block of oxyalkylene groups containing 3 or more carbon atoms. As examples of such oxyalkylene antifoaming agent (B-1), there may be mentioned the following species, and these may be used singly or two or more of them may be used combinedly.

(Poly)oxyethylene(poly)oxypropylene adducts derived from monohydric or dihydric alcohols containing 1 to 30 carbon atoms; polyoxyalkylenes such as (poly)oxyethylene (poly)oxypropylene adducts; (poly)oxyalkylene alkyl ethers such as diethylene glycol heptyl ether, polyoxyethylene oleyl ether, polyoxypropylene butyl ether, polyoxyethylene-polyoxypropylene-2-ethylhexyl ether, and oxyethylene-oxypropylene adducts derived from higher alcohols containing 12 to 14 carbon atoms; (poly)oxyalkylene (alkyl)aryl ethers such as polyoxypropylene phenyl ether and polyoxyethylene nonylphenyl ether; acetylene ethers resulting from addition polymerization of an alkylene oxide(s) onto an acetylene alcohol such as 2,4,7,9-tetramethyl-5-decyne-4,7-diol, 2,5-dimethyl-3-hexyne-2,5-diol or 3-methyl-1-butyne-3-ol. (Poly)oxyalkylene fatty acid esters such as diethylene glycol oleate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate salts such as sodium polyoxypropylene methyl ether sulfate and sodium polyoxyethylene dodecylphenyl ether sulfate; (poly)oxyalkylene alkyl phosphates such as (poly)oxyethylene stearyl phosphate; and (poly)oxyalkylenealkylamines such as polyoxyethylenelaurylamine.

Preferred as the above antifoaming agent (B) among the oxyalkylene antifoaming agents (B-1) represented by the above general formula (5) are those represented by the following general formula (6);

  (6)

in the formula, $R^7$ represents a hydrogen atom or a hydrocarbon group containing 1 to 30 carbon atoms, $R^8O$ represents an oxyalkylene group containing 3 to 18 carbon atoms, r and s each represents the average molar number of addition and r and s preferably satisfy the relations $0.2<r/(r+s)<0.8$ and $2<r+s<300$. In the general formula (6), $R^7$ is a hydrogen atom or a hydrocarbon group containing 1 to 30 carbon atoms, preferably 2 to 30, more preferably 4 to 30, still more preferably 6 to 22, especially preferably B to 22, most preferably 10 to 18 carbon atoms. Among the hydrocarbon groups, straight or branched alkyl and alkenyl groups are particularly preferred. The number of carbon atoms in the oxyalkylene group $R^8O$ is adequately 3 to 18, preferably 2 to 8, more preferably 2 to 4. Further, the moiety —$(C_2H_4O)_r/(R^8O)_s$— is composed of an oxyethylene group(s) and an oxyalkylene group(s) containing 3 to 18 carbon atoms, particularly preferably of an oxyethylene group(s) and an oxyalkylene group(s) containing 3 to 8 carbon atoms, most preferably of an oxyethylene group(s) and an oxyalkylene group(s) containing 3 to 4 carbon atoms. In this case, the moiety —$(C_2H_4O)_r/(R^8O)_s$— has a form resulting from addition of two or more alkylene oxide species. In the present specification, the mode of addition of the oxyalkylene groups in the form resulting from addition of two or more alkylene oxide species selected from among ethylene oxide, propylene oxide, butylene oxide, styrene oxide and the like may be any of the random addition, block addition, or alternating addition, for instance. In cases where two or more oxyalkylene group species are involved in the addition, it is preferred that the group $R^7O$— in the general formula (6) be bound to an oxyethylene block which in turn be bound to a block of oxyalkylene groups containing 3 or more carbon atoms. As examples of such oxyalkylene antifoaming agent, there may be mentioned the following species, and these may be used singly or two or more of them may be used combinedly.

ABA block type ones such as polyoxyethylene-polyoxypropylene-polyoxyethylene, polyoxypropylene-polyoxyethylene-polyoxypropylene and polyoxyethylenepolyoxybutylene-polyoxyethylene; polyoxyethylene-polyoxypropylene adducts derived from straight or branched alkyl or other alcohols containing 1 to 30 carbon atoms.

As the above alcohols, there may be mentioned unsaturated alcohols such as allyl alcohol, methallyl alcohol, 3-methyl-3-buten-1-ol, 3-methyl-2-buten-1-ol and 2-methyl-3-buten-2-ol; saturated aliphatic alcohols such as butanol, pentanol, octanol, lauryl alcohol, myristyl alcohol and stearyl alcohol; aromatic alcohols such as benzyl alcohol; and so forth. Polyoxyethylene-polyoxypropylene adducts derived from straight or branched alkyl alcohols containing 8 to 22 carbon atoms and straight or branched higher alcohols containing 12 to 14 carbon atoms are preferred among these.

For the above oxyalkylene antifoaming agent (B-1) to have high antifoaming capacity, prevent the increase in the amount of air entrained with the prolonged time of kneading in the production of cement compositions and have a certain level of hydrophilicity against water at 20° C., it is important that the molar number of addition of alkylene oxides and the values r and s be appropriately balanced between them. For this purpose, it is preferred that the relation $0.2 < r/(r+s) < 0.8$ be satisfied. When $r/(r+s)$ exceeds 0.8, the effect as an oxyalkylene antifoaming agent decreases. When $r/(r+s)$ is less than 0.2, the amount of air entrained increases as the time of kneading is prolonged in the production of cement compositions, leading to decreases in the strength of cement compositions. More preferably, the relation $0.3 < r/(r+s) < 0.7$ should be satisfied, still more preferably $0.35 < r/(r+s) < 0.7$. Preferably, the value (r+s) satisfies the relation $2 < (r+s) < 300$. When (r+s) is 2 or less, the amount of air entrained increases as the time of kneading is prolonged in the production of cement compositions, leading in decreases in the strength of cement compositions. When (r+s) is 300 or greater, the effect as an antifoaming agent decreases. More preferably, the relation $5 < (r+s) < 200$ should be satisfied, still more preferably $5 < (r+s) < 100$, further more preferably $5 < (r+s) < 50$, particularly preferably $5 < (r+s) < 40$, most preferably $10 < (r+s) < 40$.

Further, for the oxyalkylene antifoaming agent (B-1) to have high antifoaming capacity, prevent the increase in the amount of air entrained with the prolonged time of kneading in the production of cement compositions and have a certain level of hydrophilicity against water at 20° C., it is preferred that the group $R^6$ in the general formula (5) or $R^7$ in the general formula (6) contain 1 to 30 carbon atoms, more preferably 4 to 30, still more preferably 6 to 22, most preferably 8 to 22 carbon atoms. The species of the hydrocarbon group is preferably an alkenyl group or a straight or branched alkyl group.

In the practice of the present invention, the above antifoaming agent (B) preferably comprises an oxyalkylene antifoaming agent (B-2) having a hydrocarbon group containing 1 to 30 carbon atoms, an alkylene oxide chain composed of an oxyethylene group(s) and an oxyalkylene group(s) containing 3 to 18 carbon atoms and at least one nitrogen atom in the molecular thereof, with said alkylene oxide chain satisfying the relations $0.2 < u/(u+v) < 0.8$ and $2 < (u+v) < 300$ provided that u is the molar number of addition of ethylene oxide and v is the molar number of addition of alkylene oxide containing 3 or more carbon atoms.

The above oxyalkylene antifoaming agent (B-2) is an antifoaming agent having, in the molecular thereof, a hydrocarbon group containing 1 to 30 carbon atoms, an alkylene oxide chain composed of an oxyethylene group(s) and an oxyalkylene group(s) containing 3 to 18 carbon atoms and at least one nitrogen atom, with said alkylene oxide chain satisfying the relations $0.2 < u/(u+v) < 0.8$ and $2 < (u+v) < 300$ where u is the molar number of addition of ethylene oxide and v is the molar number of addition of the alkylene oxide containing 3 or more carbon atoms. It is characterized by having a nitrogen atom(s) in the molecular, and the nitrogen atom may be neutralized with an acidic substance, for example an inorganic acid such as hydrochloric acid, sulfuric acid or nitric acid, or an organic acid such as acetic acid, propionic acid or(meth)acrylic acid. In blending the water-soluble polymer(C)such as a polycarboxylic acid water-soluble polymer with the nitrogencontaining oxyalkylene antifoaming agent (B-2), the polycarboxylic acid water-soluble polymer may be in a form in which all carboxyl groups thereof are neutralized with a monovalent metal, such as sodium or lithium, or a divalent metal such as calcium, iron or aluminum. Preferably, however, the polycarboxylic acid water-soluble polymer is blended in a form having unneutralized, free carboxyl groups. When the water-soluble polycarboxylic acid polymer having free carboxyl groups is blended with the nitrogen-containing oxyalkylene antifoaming agent (B-2), the free carboxyl groups in the polycarboxylic acid polymer are neutralized with the nitrogen atom in the oxyalkylene antifoaming agent (B-2) to form a salt, whereby the solubility in water improved and the storage stability of aqueous medium solutions of the resulting blend of the oxyalkylene antifoaming agent (B-2) and polycarboxylic acid water-soluble polymer becomes very good. Furthermore, when this resulting blend is added to a cement composition, such as mortar or concrete, an exchange reaction occurs between Ca ions and like cations occurring in cement and the antifoaming agent, whereby the antifoaming agent is released to express its antifoaming properties. As such oxyalkylene antifoaming agent (B-2), there may be mentioned antifoaming agents represented by the following general formula (11);

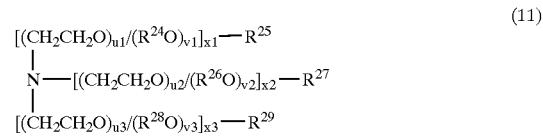

in the formula, $R^{24}$, $R^{26}$ and $R^{28}$ are the same or different and each represents an oxyalkylene group containing 3 to 18 carbon atoms, $R^{25}$, $R^{27}$ and $R^{29}$ are the same or different and each represents a hydrogen atom or a hydrocarbon group containing 1 to 30 carbon atoms, u1, u2 and u3 each represents the average molar number of addition of ethylene oxide, v1, v2 and v3 each represents the average molar number of addition of an alkylene oxide containing 3 or more carbon atoms, provided that the relations $u=u1+u2+u3$, $v=v1+v2+v3$, $0.2 < u/(u+v) < 0.8$ and $2 < (u+v) < 300$ are satisfied, x1, x2 and x3 each is 0 or 1 and at least one of x1, x2 and x3 is 1.

In the above general formula (11), $R^{25}$, $R^{27}$ and $R^{29}$ are the same or different and each represents a hydrogen atom or a hydrocarbon group containing 1 to 30 carbon atoms. The hydrocarbon group includes straight or branched alkyl groups containing 1 to 30 carbon atoms; benzene ring-containing aromatic groups containing 6 to 30 carbon atoms, such as phenyl, alkylphenyl, phenylalkyl, (alkyl)phenylsubstituted phenyl, and naphthyl; alkenyl groups containing 2 to 30 carbon atoms; and alkynyl groups containing 2 to 30 carbon atoms. When x1, x2 or x3 is 1, a hydrogen atom is preferred among them. When x1, x2 or x3 is 0, a straight or branched alkyl, straight or branched alkenyl or straight or branched alkynyl group containing 1 to 30 carbon atoms is preferred, a straight or branched alkyl, straight or branched alkenyl or straight or branched alkynyl group containing 4 to 30 carbon atoms is more preferred, and a straight or branched alkyl, straight or branched alkenyl or straight or branched alkynyl group containing 6 to 22 carbon atoms, more preferably 8 to 22 carbon atoms, is still more preferred. Among these, straight or branched alkyl groups are preferred. Suitable as $R^{24}O$, $R^{26}O$ and $R^{28}O$ are oxyalkylene groups containing 3 to 18 carbon atoms, preferably 3 to 8 carbon atoms, more preferably 3 to 4 carbon atoms. The mode of addition of the oxyethylene group(s) and oxyalkylene groups $R^{24}O$, $R^{26}O$ and $R^{28}O$ may be any of the random addition, block addition or alternating addition, for instance. In cases where two or more oxyalkylene groups are involved in the addition, it is preferred that the group $R^{25}$, $R^{27}$ or $R^{29}$— in the general formula (11) be bound to an oxyethylene group block which in turn be bound to a block of oxyalkylene groups containing 3 or more carbon atoms.

In the above general formula (11), the average molar number u of addition of oxyethylene groups and the molar number v of addition of oxyalkylene groups containing 3 to 18 carbon atoms preferably satisfy the relations $0.2<u/(u+v)<0.8$ and $2<(u+v)<300$, more preferably $5<(u+v)<200$, still more preferably $5<(u+v)<150$, further preferably $5<(u+v)<100$, still further preferably $10<(u+v)<80$, particularly preferably $10<(u+v)<50$. The proportion of the molar number u of addition of ethylene oxide relative to the total molar number $(u+v)$ of addition of alkylene oxides preferably satisfies the relation $0.2<u/(u+v)<0.8$, more preferably $0.3<u/(u+v)<0.7$, still more preferably $0.35<u/(u+v)<0.7$.

Preferred specific examples are ethylene oxide and $C_{3-18}$ alkylene oxide adducts derived from primary amines having a straight or branched alkyl group containing 1 to 30 carbon atoms or secondary amines having two equal or different alkyl group species, such as (di)methylamine, (di)ethylamine, (di)propylamine, (di)butylamine, (di)pentylamine, (di)hexylamine, (di)heptylamine, (di)octylamine, (di)nonylamine, (di)decylamine, (di)dodecylamine, (di)tetradecylamine, (di)pentadecylamine, (di)hexadecylamine, (di)heptadecylamine, (di)octadecylamine, (di)nonadecylamine and (di)icosylamine; mixtures of primary amines having a straight or branched alkyl group containing 1 to 30 carbon atoms but differing in alkyl group species, for example coconut oil fatty acid-derived primary amines, oleic acid-derived primary amines, soybean oil fatty acid-derived primary amines, beef tallow fatty acid-derived primary amines and hardened beef tallow fatty acid-derived primary amines; mixtures of secondary amines having straight or branched alkyl groups containing 1 to 30 carbon atoms but differing in alkyl group species, for example coconut oil fatty acid-derived secondary amines, oleic acid-derived secondary amines, soybean oil fatty acid-derived secondary amines, beef tallow fatty acid-derived secondary amines and hardened beef tallow fatty acid-derived secondary amines; primary or secondary amines having a benzene ring-containing aromatic group(s) containing 6 to 30 carbon atoms, such as phenyl, alkylphenyl, phenylalkyl, (alkyl)phenyl-substituted phenyl, naphthyl and the like, or an alkenyl group containing 2 to 30 carbon atoms or an alkynyl group containing 2 to 30 carbon atoms; or amines derived from polyoxyalkylene glycols having a hydrocarbon group containing 1 to 30 carbon atoms, an oxyethylene group(s) and an oxyalkylene group(s) containing 3 to 18 carbon atoms by conversion of the terminal hydroxyl group to an amino group; as well as amines derived from polyoxyalkylene glycols having a hydrocarbon group containing 1 to 30 carbon atoms, an oxyethylene group(s) and an oxyalkylene group(s) containing 3 to 18 carbon atoms by conversion of the terminal hydroxyl group to an amino group.

As compounds having a hydrocarbon group containing 1 to 30 carbon atoms, an oxyethylene group(s) and an oxyalkylene group(s) containing 3 to 18 carbon atoms in the molecular and containing two or more nitrogen atoms, which serve as the above oxyalkylene antifoaming agent (B-2), there may be mentioned ethylene oxide-$C_{3-18}$ alkylene oxide adducts derived from amide amines obtained by dehydration condensation of polyalkylenepolyamines, such as ethylenediamine, propylenediamine, diethylenetriamine, triethylenetetramine, dipropylenetriamine and tetrapropylenepentamine, with fatty acids, such as acetic acid, propionic acid, butyric acid, valeric acid, lauric acid, stearic acid, oleic acid, coconut oil-derived fatty acids, soybeanderived fatty acids, beef tallow-derived fatty acid and hardened beef tallow-derived fatty acids; ethylene oxide-$C_{3-18}$ alkylene oxide adducts derived from imidazolines obtained by further dehydration of amide amines resulting from dehydration condensation of polyalkylenepolyamines, such as ethylenediamine, propylenediamine, diethylenetriamine, triethylenetetramine, dipropylenetriamine and tetrapropylenepentamine, with fatty acids, such as acetic acid, propionic acid, butyric acid, valeric acid, lauric acid, stearic acid, oleic acid, coconut oil-derived fatty acids, soybean-derived fatty acids, beef tallow-derived fatty acid and hardened beef tallow-derived fatty acids; $C_{1-30}$ hydrocarbon group- or alkyl group-modified ethylene oxide-$C_{3-18}$ alkylene oxide adducts derived from polyalkylenepolyamines such as ethylenediamine, propylenediamine, diethylenetriamine, triethylenetetramine, dipropylenetriamine and tetrapropylenepentamine; ethylene oxide-$C_{3-18}$ alkylene oxide adducts derived from $C_{1-30}$ hydrocarbon or alkyl group modifications of polyalkylenepolyamines such as ethylenediamine, propylenediamine, diethylenetriamine, triethylenetetramine, dipropylenetriamine and tetrapropylenepentamine; $C_{1-30}$ hydrocarbon group- or alkyl group-modified ethylene oxide-$C_{3-18}$ alkylene oxide adducts derived from polyalkyleneimines, such as polyethyleneimine and polypropyleneimine which is obtained by polymerization of alkyleneimines such as ethyleneimine and propyleneimine; ethylene oxide-$C_{3-18}$ alkylene oxide adducts derived from $C_{1-30}$ hydrocarbon- or alkyl group-modified polyethyleneimine or polypropyleneimine respectively obtained by polymerization of alkyleneimines such as ethyleneimine and propyleneimine; $C_{1-30}$ hydrocarbon group- or alkyl group-modified of amines obtained from polyethylene glycols having an oxyethylene group(s) and an oxyalkylene group(s) containing 3 to 18 carbon atoms by conversions of the terminal hydroxyl groups to amino groups; and the like.

In the practice of the present invention, it is possible to synthesize unsaturated monomers having antifoaming properties by esterifying those oxyalkylene antifoaming agents (B-1) of the general formula (5) in which $R^4$ is a hydrogen atom and T is —O— or —NH— or those oxyalkylene antifoaming agents (B-2) of the general formula (11) in which any of $R^2$, $R^{27}$ and $R^{29}$ is a hydrogen atom with an unsaturated carboxylic acid such as (meth)acrylic acid or maleic acid. By copolymerizing these unsaturated monomers having antifoaming properties with a monomer providing a constituent unit represented by the general formula (7) or general formula (8) given later herein or a monomer providing a constituent unit represented by the general formula (9) or general formula (10) given later herein, it is possible to incorporate the antifoaming constituents in the polymer skeleton. Such polymers constitute a further aspect of the present invention.

An admixture for a cementitious composition comprising a water-soluble polymer(C) and water in which a foam height obtainable by causing a calcium chloride-containing aqueous medium solution of the above admixture for a cementitious composition to foam is not higher than 70% of the foam height obtainable by causing an aqueous medium solution of the above admixture for a cementitious composition to foam, percentage of foam height disappearance 5 minutes after causing the calcium chloride-containing aqueous medium solution of the above admixture for a cementitious composition to foam is not less than 50%, a cloud point of a 20% by weight aqueous medium solution of the above admixture for a cementitious composition is not lower than 5° C., and a viscosity of a calcium carbonate slurry prepared by adding an aqueous medium solution of the above admixture for a cementitious composition to calcium carbonate and adjusting the content of said admixture for a cementitious composition to 0.2% by weight relative to calcium carbonate and the content of calcium carbonate to 70% by weight is not more than 1,000 mPa·s can produce the effects of the present invention, and such admixture for a cementitious composition also constitutes a further aspect of the present invention.

In respect to the above admixture for a cementitious composition, the proportion of the foam height obtainable by causing the calcium chloride-containing aqueous medium solution of the above admixture for a cementitious composition to foam relative to the foam height obtainable by causing the aqueous medium solution of the above cement additive to foam is referred to as "foaming index 1", the percentage of foam height disappearance 5 minutes after causing the calcium chloride-containing aqueous medium solution of the above admixture for a cementitious composition as "foaming index 2", the cloud point of a 20% by weight aqueous medium solution of the above admixture for a cementitious composition as "cloud point", and the viscosity of a calcium carbonate slurry prepared by adding an aqueous medium solution of the above admixture for a cementitious composition to calcium carbonate and adjusting the content of said admixture for a cementitious composition to 0.2% by weight relative to calcium carbonate and the content of calcium carbonate to 70% by weight as "dispersion index". When the foaming index 1 and foaming index 2 satisfy the respective range requirements mentioned above, the admixture for a cementitious composition effectively exhibits its antifoaming properties under alkali- and inorganic salt-containing aqueous medium solution conditions in cement compositions such as concrete and its performance characteristics uniformly with the lapse of time. When the cloud point satisfies the above range, a uniform aqueous medium solution can be obtained, the antifoaming agent will hardly separate even during a prolonged period of storage, and uniform performance characteristics can be exhibited with the lapse of time. Furthermore, when the dispersion index satisfies the above range, the admixture can make cement compositions excellent in fluidity. When these effects are produced synergistically, the admixture for a cementitious composition becomes one having great water-reducing capacity and capable of stably maintaining the amount of air entrained without allowing increases in the amount of air even when the time of kneading is prolonged in the production of cement composition.

In the above admixture for a cementitious composition, it is preferred, for example, that the above-defined foaming index 1 be 0 to 70%, the above foaming index 2 be 50 to 100%, the above cloud point be 5 to 80° C. and the above dispersion index be not more than 1,000 mPa·s. More preferably, the above foaming index 1 is 0 to 50%, the above foaming index 2 is 60 to 100%, the above cloud point is 5 to 60° C. and the above dispersion index is not more than 800 mpa·s. Still more preferably, the above foaming index 1 is 0 to 40%, the above foaming index 2 is 70 to 100%, the above cloud point is 10 to 50° C. and the above dispersion index is not more than 500 mpa·s.

The composition of the above admixture for a cementitious composition is not particularly restricted provided that it comprises a water-soluble polymer(C) and water and that the above foaming index 1, foaming index 2, cloud point and dispersion index fall within the respective ranges specified above. For example, it is preferred that a compound or polymer having antifoaming properties be used and that the above-mentioned compound (A) and/or antifoaming agent (B), among others, be used. When the above compound (A) and/or antifoaming agent (B) is used, it becomes easy to prepare an admixture for a cementitious composition satisfying all the four requirements mentioned above and the effects of the present invention can be fully produced. Preferred embodiments of the above compound (A) and/or antifoaming agent (B) are the same as those mentioned hereinabove.

The following methods, for instance, are suitably used as the methods of measuring the above foaming index 1, foaming index 2 and dispersion index. As for the cloud point measurement method, the above-mentioned method of cloud point measurement can be used where the admixture for a cementitious composition is used in lieu of the antifoaming agent.

(Foaming Index Measurement Method)

(1) An aqueous medium solution (100 g) is prepared by weighing 0.5 g of an admixture for a cementitious composition adjusted to a solid content of 20% by weight in a polypropylene vessel with an inside diameter of 65 mm and a height of 92 mm [product of Teraoka: Pack-Ace 250 (trademark)] and adding 99.5 g of a 0.1% by weight aqueous solution of Vinsol (trademark, product of Yamaso Xagaku) [the concentration of the sample (admixture for a cementitious composition) on that occasion being 0.1% by weight].

(2) In an atmosphere at a temperature of 20° C. and a humidity of 60%, a homomixer (product of Tokushu Kika Kogyo; T. K. Auto Homomixer (trademark), stirrer portion: homomixer high-viscosity type) is disposed in the aqueous medium solution prepared as mentioned above under (1) (for the method of disposing, see FIG. 1; the homomixer is disposed in the center of Pack-Ace) and the solution is stirred at 4,000 rpm for 5 minutes.

(3) Thereafter, the rotation is stopped and the solution is allowed to stand. After 30 seconds, the height of the foam layer (foam height) is measured. The difference between the lowest position of the foam-gaseous phase interface and the foam-liquid phase interface is taken as the foam height.

(4) Then, 10 g of calcium chloride (product of Kishida Kagaku Kogyo, purity 99.9%) is weighed in a polypropylene vessel with an inside diameter of 65 mm and a height of 92 mm [product of Teraoka; Pack-Ace 250 (trademark)]. A 0.5 g portion of the cement additive adjusted to a solid content of 20% by weight is weighed and added thereto, and 99.5 g of a 0.1% by weight aqueous solution of Vinsol (trademark, product of Yamaso Kagaku) is added (preparation of a calcium chloride-containing aqueous medium solution).

(5) The same procedures as mentioned above under (2) and (3) are carried out, and the foam height in the calcium chloride-containing aqueous medium solution is measured.

(6) The difference in foam height is calculated from the values obtained in the above procedures (3) and (5).

The above foaming index 1 can be calculated as {X1/Y1}×100, where X1 is the foam height (mm) obtained with the calcium chloride-containing aqueous medium solution of the admixture for a cementitious composition, namely the value obtained as mentioned above in (5), and Y1 is the foam height (mm) obtained with the aqueous medium solution of the admixture for a cementitious composition, namely the value obtained as mentioned above in (3). The above foaming index 2, which is percentage of foam height disappearance 5 minutes after causing the calcium chloride-containing aqueous medium solution of the admixture for a cementitious composition to foam (relative to the foam height after 30 seconds), can be calculated as ((X1-X2)/X1)×100 where X1 is the value obtained as mentioned above in (5) and X2 is the foam height (mm) after 5 minutes following 5 minutes of stirring of the calcium chloride-containing aqueous medium solution of the admixture for a cementitious composition with the homomixer in the above-mentioned procedure (2).

(Dispersion Index Measurement Method)

(1) Calcium carbonate [150 g; product of Nitto Funka Kogyo: NS #200 (trademark), specific surface area 12,000 $cm^2/g$, mean particle diameter 1.85 microns] is placed in a polypropylene vessel with an inside diameter of 65 mm and a height of 92 mm [product of Teraoka: Pack-Ace 250 (trademark)].

(2) Water (45 g) containing the admixture for a cementitious composition is added to the calcium carbonate-containing vessel so that the admixture for a cementitious composition amounts to 0.2 part by weight relative to 100 parts by weight of calcium carbonate, namely the admixture for a cementitious composition is 0.2% by weight relative to calcium carbonate.

(3) The resulting calcium carbonate slurry is stirred manually for 1 minute using a stainless steel (SUS) spatula.

(4) Using a homomixer [product of Tokushu Kika Kogyo: T. K. Auto Homomixer model M (trademark)], the slurry is stirred at 5,000 rpm for 3 minutes.

(5) The mixture after stirring is allowed to stand in a constant temperature vessel at 20° C. for 1 hour to adjust the calcium carbonate slurry to 20° C.

(6) Using the above homomixer, redispersion is effected by 1 minute of stirring at 2,000 rpm.

(7) A 80-cc portion of the calcium carbonate slurry prepared as mentioned above in (6) is placed in a glass vessel with a diameter of 40 mm and a height of 120 mm [product of Maruemu: Screw tube No. 8 (trademark)], and the viscosity at 20° C. is measured using a type B viscometer [product of Tokyo Keiki: B8L (trademark); the measurement being carried out under the following conditions: ① 60 rpm using a No. 2 rotor until 500 mPa·s, ② 60 rpm using a No. 3 rotor from 500 to 2,000 mPa·s and ③ 60 rpm using a No. 4 rotor from 2,000 to 10,000 mPa·s].

The above-mentioned water-soluble polymer(C) to be used in the practice of the invention is now described.

The above water-soluble polymer has a sufficient content of a hydrophilic structural unit to render the polymer water soluble. The hydrophilic structural unit includes anionic, nonionic and cationic structural units, and one or two or more of these structural unit species may be contained. For the polymer to serve as an excellent cement dispersant, it preferably has both of an anionic group and a nonionic group as hydrophilic structural units, if necessary further together with a cationic group.

As the above anionic group, there may be mentioned, for example, carboxyl, sulfonic acid, phosphoric acid, carbonic acid, silicic acid and nitric acid groups. The polymer may have one or more of these anionic groups and, most preferably, it has a carboxyl group as an essential unit, if necessary further together with a sulfonic acid group. The nonionic group includes, for example, (alkoxy)(poly)alkylene glycol residues and alkyl ether groups. The polymer may have one or more of these nonionic groups. Preferably, it has an (alkoxy)polyalkylene glycol residue as an essential unit and, more preferably, it has a polyethylene glycol or alkoxypolyethylene glycol residue, among them. The cationic group includes, for example, amino, amido and imino groups, polyalkylenepolyamine residues, and residues derived from polyamidepolamines or polyalkyleneimines, or from alkylene oxide adducts of these. The polymer may have one or more of these cationic groups. Preferably, it has the residue of a polyalkylenepolyamine or an alkylene oxide adduct thereof and/or the residue of a polyamidepolyamine or an alkylene oxide adduct thereof.

Preferably, the above anionic group occurs, in each gram of the water-soluble polymer solid, in an amount of 0.1 to 13.0 mq/g, more preferably 0.2 to 10.0 mq/g, still more preferably 0.5 to 5.0 mq/g, and the carboxyl group should preferably satisfy this range. Preferably, the nonionic group occurs, in the water-soluble polymer, in an amount of 1 to 95% by weight, more preferably 30 to 95% by weight, still more preferably 40 to 95% by weight, and the (alkoxy)polyalkylene glycol residue should preferably satisfy this range. The cationic group preferably occurs in the water-soluble polymer in an amount of 0.1 to 13.0 mq/g.

The molecular weight of the above water-soluble polymer is not particularly restricted provided that the molecular weight is sufficient for the manifestation of cement dispersing ability but it is preferred that the polymer have a weight average molecular weight within the range of 5,000 to 1,000,000 (on the polyethylene glycol equivalent basis: GPC). From the viewpoint of cement dispersing ability, the weight average molecular weight is preferably within the range of 5,000 to 500,000, more preferably within the range of 10,000 to 300,000.

The carboxyl group in the water-soluble polymer can be measured in the following manner. An aqueous medium solution of the polymer as adjusted to pH 2 or below is subjected to potentiometric titration. The carboxyl group content can be calculated from the amount of NaOH required to arrive at the second inflection point from the first inflection point.

Measurement Method (Potentiometric Titration)

(1) A 0.5-g portion of the polymer is dissolved in 50 ml of water.

(2) The pH of the aqueous medium solution of the polymer is adjusted to 2 or below using a 0.1 N aqueous hydrochloric acid solution.

(3) Potentiometric titration is carried out using a 0.1 N aqueous sodium hydroxide solution.

(4) The carboxylic acid-due acid value (mq/g) of the polymer is calculated from the amount of NaOH required to arrive at the second inflection point from the first inflection point and the accurate weight of the polymer.

First inflection point: The inflection point due to neutralization of hydrochloric acid;

Second inflection point: The inflection point due to neutralization of the carboxylic acid.

The polyethylene glycol content in the above water-soluble polymer can be determined in the following manner.
(1) Using a standard substance and polyethylene glycol, a standard curve (weight ratio vs. integrated area ratio from H-NMR spectrometry) is constructed.
(2) The polymer and internal standard substance are uniformly mixed and subjected to H-NMR spectrometry.
(3) The weight of the "3.3–3.9 ppm peak appearing at the same position as that of the polyethylene glycol" is calculated from the standard curve based on the area ratio of the integrated values of the "3.3–3.9 ppm peak appearing at the same position as that of the polyethylene glycol" and the "peak of the internal standard substance".

The above water-soluble polymer(C)is not particularly restricted but may be any of those capable of exhibiting a water-reducing capacity on cement compositions. Polycarboxylic acid polymers having polyalkylene glycol moieties in side chains are preferably used, however. Such a polycarboxylic acid polymer can be used as an essential constituent of a cement dispersant and is called polycarboxylic acid polymer cement dispersant or water-reducing agent.

Preferred as the above polycarboxylic acid polymer is a polycarboxylic acid polymer(C-1)having a polyoxyalkylene ester constituent unit (I) represented by the following general formula (7);

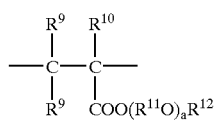

(7)

in the formula, $R^9$ and $R^{10}$ are the same or different and each represents a hydrogen atom or a methyl group, the a $R^{11}O$ groups are the same or different and each represents an oxyalkylene group containing 2 to 18 carbon atoms, a represents the average molar number of addition of the oxyalkylene group and is a number of 2 to 300 and $R^{12}$ represents a hydrogen atom or a hydrocarbon group containing 1 to 30 carbon atoms, and a carboxylic acid constituent unit (II) represented by the following general formula (8);

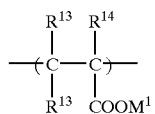

(8)

in the formula, $R^{13}$ and $R^{14}$ are the same or different and each represents a hydrogen atom or a methyl group and $M^1$ represents a hydrogen atom, a monovalent metal, a divalent metal, ammonium or a protonated organic amine.

Also preferred as the above polycarboxylic acid polymer is a polycarboxylic acid polymer(C-2)having a polyoxyalkylene ether constituent unit (III) represented by the following general formula (9);

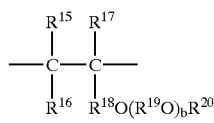

(9)

in the formula, $R^{15}$, $R^{16}$ and $R^{17}$ are the same or different and each represents a hydrogen atom or a methyl group, $R^{18}$ represents a hydrocarbon group containing 1 to 5 carbon atoms, the b $R^{19}O$ groups are the same or different and each represents an oxyalkylene group containing 2 to 18 carbon atoms, b represents the average molar number of addition of the oxyalkylene group and is a number of 2 to 300 and $R^{20}$ represents a hydrogen atom or a hydrocarbon group containing 1 to 30 carbon atoms, and a carboxylic acid constituent unit (IV) represented by the following general formula (10);

(10)

in the formula, $R^{21}$ and $R^{22}$ are the same or different and each represents a hydrogen atom, a methyl group or —$COOM^3$ provided that $R^{21}$ and $R^{22}$ do not represent —$COOM^3$ simultaneously, $R^{23}$ represents a hydrogen atom, a methyl group or —$CH_2COOM^4$, $R^{21}$ and $R^{22}$ are the same or different and each represents a hydrogen atom or a methyl group when R23 is —$CH_2COOM^4$, $M^2$, $M^3$ and $M^4$ each represents a hydrogen atom, a monovalent metal, a divalent metal, ammonium or a protonated organic amine.

Thus, the above water-soluble polymer(C)preferably comprises the above polycarboxylic acid polymer(C-1) and/or the above polycarboxylic acid polymer(C-2). Such water-soluble polymer(C)may be composed of the above polycarboxylic acid polymer(s) alone or may further comprise another one but preferably comprises a polycarboxylic acid polymer as a main constituent.

The above-mentioned polycarboxylic acid polymers (C-1)and(C-2)are characterized in that they have the above-mentioned essential constituent units (repeating units) and may further have a constituent unit (V) derived from the monomer (e) mentioned later herein. These constituent units each may comprise one single species or two or more species.

The above polycarboxylic acid polymer(C-1)can be produced by copolymerizing a monomer composition comprising a monomer giving the constituent unit (I) (e.g. the monomer (a) mentioned later herein) and a monomer giving the constituent unit (II) (e.g. the monomer (b) mentioned later herein). Such a monomer composition may further contain a monomer giving the constituent unit (V) (e.g. the monomer (e) mentioned later herein). In cases where each constituent unit comprises a single species, it is sufficient to use single monomer species for giving each constituent unit. In cases where each constituent unit comprises two or more species, two or more monomer species giving the respective constituent unit species are to be used.

As for the proportions of the respective constituent units constituting the above polycarboxylic acid polymer (C-1), the constituent unit (I)/constituent unit (II)/constituent unit (V) ratio is preferably 1 to 99/99 to 1/0 to 50 on the weight basis. The constituent unit (I)/constituent unit (II)/constituent unit (V) ratio is more preferably 50 to 99/50 to 1/0 to 49, still more preferably 60 to 95/40 to 5/0 to 30, most preferably 70 to 95/30 to 5/0 to 10. The total of the constituent unit (I), constituent unit (II) and constituent unit (V) is 100% by weight, however.

The above polycarboxylic acid polymer(C-1)may also be produced by directly esterifying, with an alkoxypolyalkylene glycol, at least some of the carboxyl groups of a polymer obtained by copolymerizing a monomer composition comprising an unsaturated monocarboxylic acid monomer, such as acrylic acid, methacrylic acid or crotonic acid, and a monomer giving a constituent unit (II) (e.g. a monomer (b) mentioned later herein).

Referring to the above general formula (7), the hydrocarbon group containing 1 to 30 carbon atoms as represented by $R^{12}$ may be, for example, an alkyl group containing 1 to 30 carbon atoms, a benzene ring-containing aromatic group containing 6 to 30 carbon atoms, such as a phenyl, alkylphenyl, phenylalkyl, (alkyl)phenyl-substituted phenyl or naphthyl group, or an alkenyl group containing 2 to 30 carbon atoms. The average molar number a of addition of the oxyalkylene group, which is a number of 2 to 300, is preferably a number of 5 to 300, more preferably 10 to 300, still more preferably 15 to 300, most preferably 20 to 200. Further, the number of carbon atoms in $R^{12}$ is preferably 1 to 22, more preferably 1 to 18, still more preferably 1 to 12, further preferably 1 to 6, particularly preferably 1 to 5, most preferably 1 to 3.

The number of carbon atoms in the oxyalkylene group $R^{11}O$ in the above general formula (7) is adequately 2 to 18, preferably 2 to 8, more preferably 2 to 4. In cases where the constituent unit (I) comprises a single species, it is preferred that the oxyalkylene group comprises an oxyethylene group so that the balance between hydrophilicity and hydrophobicity may be secured, and it is more preferred that the oxyethylene groups account for not less than 50 mole percent, particularly preferably not less than 60 mole percent. On the other hand, in cases where the constituent unit (I) comprises two or more species, it is preferred that any one of the constituent units (I) comprises an oxyethylene group in the oxyalkylene group thereof.

As the monomer (a) giving the above constituent unit (I), there may be mentioned, for example, $C_{2-18}$ alkylene oxide adducts derived from (meth)acrylic acid, crotonic acid or a fatty acid dehydration (oxidation) product, and esterification products of (meth)acrylic acid or crotonic acid with alkoxypolyalkylene glycols obtained by addition of a $C_{2-18}$ alkylene oxide to any of saturated aliphatic alcohols containing 1 to 30 carbon atoms, such as methanol, ethanol, 2-propanol, 1-butanol, 1-pentanol, 1-hexanol, octanol, 2-ethyl-1-hexanol, nonyl alcohol, lauryl alcohol, cetyl alcohol, stearyl alcohol, etc., unsaturated aliphatic alcohols containing 3 to 30 carbon atoms, such as allyl alcohol, methallyl alcohol, crotyl alcohol, oleyl alcohol, etc., alicyclic alcohols containing 3 to 30 carbon atoms, such as cyclohexanol, and aromatic alcohols containing 6 to 30 carbon atoms, such as phenol, phenylmethanol (benzyl alcohol), methylphenol (cresol), p-ethylphenol, dimethylphenol (xylenol), p-tert-butylphenol, nonylphenol, dodecylphenol, phenylphenol, naphthaol, etc. Preferred are, however, those ester compounds of alkoxypolyalkylene glycols corresponding to the cases where $R^{12}$ is a hydrocarbon group in general formula (7), with (meth)acrylic acid or crotonic acid.

The above monomer (a) includes the following, as given by specific chemical name: methoxypolyethylene glycol mono(meth)acrylate, ethoxypolyethylene glycol mono(meth)acrylate, 1-propoxypolyethylene glycol mono(meth)acrylate, 2-propoxypolyethylene glycol mono(meth)acrylate, 1-butoxypolyethylene glycol mono(meth)acrylate, 2-butoxypolyethylene glycol mono(meth)acrylate, 2-methyl-1-propoxypolyethylene glycol mono(meth)acrylate, 2-methyl-2-propoxypolyethylene glycol mono(meth)acrylate, 1-pentyloxypolyethylene glycol mono(meth)acrylate, 1-hexyloxypolyethylene glycol mono(meth)acrylate, cyclohexyloxypolyethylene glycol mono(meth)acrylate, 1-octyloxypolyethylene glycol mono(meth)acrylate, 2-ethyl-1-hexyloxypolyethylene glycol mono(meth)acrylate, nonylalkoxypolyethylene glycol mono(meth)acrylate, laurylalkoxypolyethylene glycol mono(meth)acrylate, cetylalkoxypolyethylene glycol mono(meth)acrylate, stearylalkoxypolyethylene glycol mono(meth)acrylate, phenoxypolyethylene glycol mono(meth)acrylate, phenylmethoxypolyethylene glycol mono(meth)acrylate, methylphenoxypolyethylene glycol mono(meth)acrylate, p-ethylphenoxypolyethylene glycol mono(meth)acrylate, dimethylphenoxypolyethylene glycol mono(meth)acrylate, p-tert-butylphenoxypolyethylene glycol mono(meth)acrylate, nonylphenoxypolyethylene glycol mono(meth)acrylate, dodecylphenoxypolyethylene glycol mono(meth)acrylate, phenylphenoxypolyethylene glycol mono(meth)acrylate, naphthoxypolyethylene glycol mono(meth)acrylate, esterification products derived from (meth)allyl alcohol-ethylene oxide adducts and (meth)acrylic acid, esterification products derived from crotyl alcohol-ethylene oxide adducts and (meth)acrylic acid, and various like alkoxypolyethylene glycol mono(meth)acrylates.

Methoxypolypropylene glycol mono(meth)acrylate, ethoxypolypropylene glycol mono(meth)acrylate, 1-propoxypolypropylene glycol mono(meth)acrylate, 2-propoxypolypropylene glycol mono(meth)acrylate, 1-butoxypolypropylene glycol mono(meth)acrylate, esterification products derived from (meth)allyl alcohol-propylene oxide adducts and (meth)acrylic acid, esterification products derived from crotyl alcohol-propylene oxide adducts and (meth)acrylic acid, and like various alkoxypolypropylene glycol mono(meth)acrylates.

Methoxypolyethylene-polypropylene glycol mono(meth)acrylate, methoxypolyethylene-polybutylene glycol mono(meth)acrylate, ethoxypolyethylene-polypropylene glycol mono(meth)acrylate, ethoxypolyethylene-polybutylene glycol mono(meth)acrylate, 1-propoxypolyethylene-polypropylene glycol mono(meth)acrylate, 1-propoxypolyethylene-polybutylene glycol mono(meth)acrylate, 2-propoxypolyethylene-polypropylene glycol mono(meth)acrylate, 2-propoxypolyethylene-polybutylene glycol mono(meth)acrylate, 1-butoxypolyethylene-polypropylene glycol mono(meth)acrylate, 1-butoxyethylne-polybutylene glycol mono(meth)acrylate, such esterification products as obtained from alcohols in which two or more alkylene oxide species with (meth)acrylic acid as esterification products derived from (meth)allyl alcohol-ethylene oxide/propylene oxide or ethylene oxide/butylene oxide adducts and (meth)acrylic acid, esterification products derived from crotyl alcohol-ethylene oxide/propylene oxide or ethylene oxide/butylene oxide adducts and (meth)acrylic acid, and like various alkoxypolyalkylene glycol mono(meth)acrylates.

As the monomer (b) giving the constituent unit (II) represented by the above general formula (8), there may be mentioned, for example, acrylic acid, methacrylic acid, crotonic acid, and metal salts, ammonium salts and amine salts of these. In particular, (meth)acrylic acid and salts thereof are preferred.

The above polycarboxylic acid polymer(C-2)can be produced by copolymerizing a monomer composition comprising a monomer giving the constituent unit (III) (e.g. the monomer (c) mentioned later herein) and a monomer giving the constituent unit (IV) (e.g. the monomer (d) mentioned later herein). Such a monomer composition may further comprise a monomer giving the constituent unit (V) (e.g. the monomer (e) mentioned later herein).

As for the proportions of the respective constituent units constituting the above polycarboxylic acid polymer (C-2), the constituent unit (III)/constituent unit (IV)/constituent unit (V) is preferably 1 to 99/99 to 1/0 to 50 on weight basis. The constituent unit (III)/ constituent unit (IV)/constituent unit (V) is more preferably 50 to 99/50 to 1/0 to 49, still more preferably 60 to 95/40 to 5/0 to 30, most preferably 70 to 95/30 to 5/0 to 10. The total of the constituent units (III), constituent unit (IV) and constituent unit (V) is to 100% by weight, however.

The above polycarboxylic acid polymer(C-2)can also be obtained by causing 2 to 300 moles, on average, of an alkylene oxide(s) to add to, or reacting an alkoxypolyalkylene glycol with an average molar number of addition of 2 to 300 with, polymers obtained by copolymerizing a monomer composition comprising an unsaturated alcohol, such as allyl alcohol, methallyl alcohol, 3-methyl-3-buten-1-ol, 3-methyl-2-buten-1-ol or 2-methyl-3-butene-2-ol, and a monomer giving the constituent unit (IV) (e.g. the monomer (d) mentioned later herein).

In the above general formula (9), the average molar number b of addition of an oxyalkylene group(s) is a number of 2 to 300 but is preferably a number of 5 to 300, more preferably 10 to 300, still more preferably 20 to 300, particularly preferably 25 to 200. The number of carbon atoms in $R^{20}$ is preferably 1 to 22, more preferably 1 to 18, still more preferably 1 to 12, further preferably 1 to 6, particularly preferably 1 to 5, most preferably 1 to 3. Furthermore, the number of carbon atoms in $R^{18}$ is 1 to 5, but is preferably 1 to 4, more preferably 1 to 3 and, particularly preferably, is the structure —$CH_2$—, —$(CH_2)_2$— or —$C(CH_3)_2$—.

The number of carbon atoms of the oxyalkylene group $R^{19}O$ in the above general formula (9), which is 2 to 18, is preferably 2 to 8, more preferably 2 to 4. In cases where the constituent unit (III) comprises a single species, the oxyalkylene groups preferably comprises an oxyethylene group so that a balance between hydrophilicity and hydrophobicity may be secured; more preferably, oxyethylene groups account for not less than 50 mole percent, particularly preferably not less than 60 mole percent.

As the monomer (d) giving the constituent unit (IV) represented by the above general formula (10), there may be mentioned, for example, unsaturated monocarboxylic acid monomers such as acrylic acid, methacrylic acid and crotonic acid, or metal, ammonium and amine salts of these; and unsaturated dicarboxylic acid monomers such as maleic acid, itaconic acid, citraconic acid and fumaric acid, or metal, ammonium and amine salts of these. Furthermore, anhydrides of these can also be used. For example, maleic anhydride, itaconic anhydride and citraconic anhydride may be mentioned. Those unsaturated monocarboxylic acid monomers in which $R^{21}$, $R^{22}$ and $R^{23}$ are the same or different and each is a hydrogen atom or a methyl group are preferably used among these and, in particular, (meth)acrylic acid, maleic acid, maleic anhydride, and salts of these are preferably used.

The monomer (e) giving the constituent unit (V), which can be used in the practice of the present invention, is not particularly restricted but may be any monomer copolymerizable with at least one of the other monomers. For example, the following may be mentioned:

Half esters and diesters of unsaturated dicarboxylic acids, such as maleic acid, fumaric acid, itaconic acid and citraconic acid, with alcohols containing 1 to 4 carbon atoms; half amides and diamides of such unsaturated dicarboxylic acids as mentioned above with amines containing 1 to 30 carbon atoms; half esters and diesters of alkyl(poly)alkylene glycols derived from such alcohols or amines as mentioned above by addition of 1 to 500 moles of an alkylene oxide(s) containing 2 to 18 carbon atoms with such unsaturated dicarboxylic acids as mentioned above; half esters and diesters of such unsaturated dicarboxylic acids as mentioned above with glycols containing 2 to 18 carbon atoms or polyalkylene glycols derived from such glycols (molar number of addition: 2 to 300).

Half amides derived from maleamic acid and glycols containing 2 to 18 carbon atoms or polyalkylene glycols derived from such glycols (molar number of addition: 2 to 300); (poly)alkylene glycol di(meth)acrylates such as triethylene glycol di(meth)acrylate, (poly)ethylene glycol di(meth)acrylate, polypropylene glycol di(meth)acrylate and (poly)ethylene glycol-(poly)propylene glycol di(meth) acrylate; bifunctional (meth)acrylates such as hexanediol di(meth)acrylate, trimethylolpropane tri(meth)acrylate and trimethylolpropane di(meth)acrylate; (poly)alkylene glycol dimaleates such as triethylene glycol dimaleate and polyethylene glycol dimaleate.

Unsaturated sulfonic acids such as vinylsulfonate, (meth) allylsulfonate,2-(meth)acryloxyethylsulfonate, 3-(meth) acryloxypropylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxy sulfobenzoate, 4-(meth) acryloxybutylsulfonate, (meth)acrylamidomethylsulfonic acid, (meth)acrylamidoethylsulfonic acid, 2-methylpropanesulfonic acid (meth)acrylamide and styrenesulfonic acid as well as monovalent metal, divalent metal, ammonium and organic amine salts of these; unsaturated monocarboxylic acids such as acrylic acid, methacrylic acid and crotonic acid as well as metal, ammonium and amine salts thereof.

Esters of unsaturated monocarboxylic acids with alcohols containing 1 to 4 carbon atoms, such as methyl (meth) acrylate, ethyl (meth)acrylate, propyl (meth)acrylate, glycidyl (meth)acrylate, methyl crotonate, ethyl crotonate and propyl crotonate; amides of unsaturated monocarboxylic acids with amines containing 1 to 30 carbon atoms, such as methyl(meth)acrylamide; vinyl aromatic compounds such as styrene, α-methylstyrene, vinyltoluene and p-methylstyrene; alkanediol mono(meth)acrylates such as 1,4-butanediol mono(meth)acrylate, 1,5-pentanediol mono (meth)acrylate and 1,6-hexanediol mono(meth)acrylate; dienes such as butadiene, isoprene, 2-methyl-1,3-butadiene and 2-chloro-1,3-butadiene; unsaturated amides such as (meth)acrylamide, (meth)acrylalkylamides, N-methylol (meth)acrylamide and N,N-dimethyl(meth)acrylamide; unsaturated cyanides such as (meth)acrylonitrile and α-chloroacrylonitrile.

Unsaturated esters such as vinyl acetate and vinyl propionate; unsaturated amines such as aminoethyl (meth) acrylate, methylaminoethyl (meth)acrylate, diemthylaminoethyl (meth)acrylate, dimethylaminopropyl (meth)acrylate, dibutylaminoethyl (meth)acrylate and vinylpyridine; divinyl aromatic compounds such as divinylbenzene; cyanurates such as triallyl cyanurate; allyl compounds such as (meth) allyl alcohol and glycidyl (meth)allyl ether; unsaturated amino compounds such as dimethylaminoethyl (meth) acrylate; vinyl ethers or allyl ethers such as methoxypolyethylene glycol monovinyl ether, polyethylene glycol monovinyl ether, methoxypolyethylene glycol mono(meth) allyl ether and polyethylene glycol mono(meth)allyl ether.

Siloxane derivatives such as polydimethylsiloxanepropylaminomaleamic acid, polydimethylsiloxaneaminopropyleneaminomaleamic acid, polydimethylsiloxane-bis-(propylaminomaleamic acid), polydimethylsiloxane-bis-(dipropyleneaminomaleamic acid), polydiemthylsiloxane-(1-propyl-3-acrylate), polydimethylsiloxane-(1-propyl-3-methacrylate), polydimethylsiloxane-bis-(1-propyl-3-acrylate) and polydimethylsiloxane-bis-(1-propyl-3-methacrylate); unsaturated phosphate esters such as 2-acryloyloxyethyl phosphate and 2-methacryloyloxyethyl phosphate.

Compounds derived, by addition of a specific amount of an alkylene oxide(s), from polyamidepolyamines prepared from condensation products, prepared in turn from polyalkylenepolyamines such as diethylenetriamine, triethylenetetramine, tetraethylenepentamine, pentaethylenehexamine, dipropylenetriamine, tripropylenetetramine and tetrapropylenepentamine and dibasic acids such as malonic acid, succinic acid, fumaric acid, maleic acid, azelaic acid or sebacic acid or esterification products obtained from such dibasic acids and alcohols containing 1 to 20 carbon atoms or condensation products from such dibasic acids and alcohols containing 1 to 20 carbon atoms, by subjecting to further condensation, in specific proportions, with (meth)acrylic acid or an esterification product from (meth)acrylic acid and an alcohol containing 1 to 20 carbon atoms, or glycidyl (meth)acrylate, allyl glycidyl ether or a like unsaturated epoxy compound; nitrogen-containing cationic monomers, for example condensation products derived from compounds resulting from addition of an alkylene oxide(s), such as ethylene oxide and propylene oxide, to an active hydrogen atom of a polyalkyleneimine, such as polyethyleneimine or polypropyleneimine, and (meth)acrylic acid or an esterification product from (meth) acrylic acid and an alcohol containing 1 to 20 carbon atoms or an unsaturated epoxy compound such as glycidyl (meth) acrylate or allyl glycidyl ether.

For obtaining the above polycarboxylic acid polymer (C-1) or (C-2 the monomer composition mentioned above is polymerized using a polymerization initiator. The polymerization can be carried out in the manner of polymerization in a solvent or bulk polymerization, for instance. The polymerization in a solvent can be carried out by the batch method or by the continuous method. As the solvent to be used on that occasion, there may be mentioned one or two or more species of water; lower alcohols such as methyl alcohol, ethyl alcohol and 2-propanol; aromatic or aliphatic hydrocarbons such as benzene, toluene, xylene, cyclohexane and n-hexane; ester compounds such as ethyl acetate; ketone compounds such as acetone and methyl ethyl ketone; and so forth. In view of the solubility of the starting monomer and of the product polycarboxylic acid polymer (C-1) or (C-2 and in view of the ease of handling in using the polycarboxylic acid polymer (C-1) or (C-2, at least one species selected from the group consisting of water and lower alcohols containing 1 to 4 carbon atoms is preferably used. In that case, methyl alcohol, ethyl alcohol and 2-propanol are particularly effective among the lower alcohols containing 1 to 4 carbon atoms.

In cases where the polymerization for producing the above polycarboxylic acid polymer (C-1) or (C-2 is carried out in an aqueous medium, a water-soluble polymerization initiator, such as ammonium or alkali metal persulfate or hydrogen peroxide, is preferably used as a polymerization initiator. In this case, a promoter, such as sodium hydrogen sulfite, Mohr's salt, ascorbic acid (salt) or Rongalite, may be used combinedly. In carrying out the polymerization using a lower alcohol, an aromatic hydrocarbon, an aliphatic hydrocarbon, an ester compound or a ketone compound as the solvent, a peroxide such as benzoyl peroxide or lauroyl peroxide; a hydroperoxide such as cumene hydroperoxide; or an azo compound such as azobisisobutyronitrile, for instance, is preferably used as the polymerization initiator. In this case, it is also possible to use a promoter such as an amine compound combinedly. Furthermore, in cases where a water-lower alcohol mixed solvent is used, an appropriate polymerization initiator or polymerization initiator-promoter combination can be selected from among those various ones mentioned above. The polymerization can appropriately be selected according to the solvent and/or polymerization initiator employed. Generally, however, the polymerization is carried out at 0 to 120° C., preferably 30 to 100° C., more preferably 50 to 95° C.

When the polymerization is carried out in the manner of bulk polymerization, it is generally conducted at 50 to 200° C. using, as the polymerization initiator, a peroxide such as benzoyl peroxide or lauroyl peroxide; a hydroperoxide such as cumene hydroperoxide; or an azo compound such as azobisisobutyronitrile, and the like.

For adjusting the molecular weight of the product polycarboxylic acid polymer (C-1) or (C-2, a chain transfer agent, such as hypophosphorous acid (or a salt thereof) or a thiol can be used in combination. The thiol chain transfer agent to be used on that occasion is represented by the general formula HS—$R^{30}$-$E_g$ (wherein $R^{30}$ represents an alkyl group containing 1 or 2 carbon atoms, E represents the group —OH, —COOM, —COOR$^{31}$ or $SO_3M$, M represents a hydrogen atom, a monovalent metal, a divalent metal, an ammonium group or a protonated organic amine group, $R^{31}$ represents an alkyl group containing 1 to 10 carbon atoms and g represents an integer of 1 or 2), and includes, for example, mercaptoethanol, thioglycerol, thioglycolic acid, 2-mercaptopropionic acid, 3-mercaptopropionic acid, thiomalic acid, octyl thioglycolate and octyl 3-mercaptopropionate. One or two or more species of these may be used. It is also effective in adjusting the molecular weight of the polycarboxylic acid polymer (C-1) or (C-2 to use a monomer highly capable of chain transfer, such as (meth)allylsulfonic acid (or a salt thereof), as the monomer (e).

While the above-mentioned polycarboxylic acid polymer (C-1) or (C-2 may be used as such, it is preferable, in cases where its solubility in water is insufficient, to use it in the form of a polymer salt obtained by further neutralization with an alkaline substance, for example such an inorganic material as the hydroxide, chloride or carbonate of a monovalent or divalent metal; ammonia; or a protonated organic amine (preferably a monovalent metal hydroxide such as sodium hydroxide or potassium hydroxide), so that the solubility in water may be improved and the polymer may be handled in the form of an organic solvent-free aqueous medium solution.

The above polycarboxylic acid polymer (C-1) or (C-2) adequately has-a weight average molecular weight of, for example, 5,000 to 1,000,000, preferably 5,000 to 500,000, more preferably 10,000 to 300,000, as expressed in terms of polyethylene glycol equivalent as determined by gel permeation chromatography (hereinafter referred to as "GPC"). When the weight average molecular weight is less than 5,000, the ability to prevent material segregation may decrease. When it exceeds 1,000,000, the dispersing ability may decrease.

(Weight Average Molecular Weight Measurement Conditions)

Apparatus: Waters LCM1

Detector: Waters model 410 differential refractive index detector

Analyzing software: Waters MILLENNIUM Ver. 2.18

Eluent: The eluent to be used is prepared by dissolving 115.6 g of sodium acetate trihydrate in a mixture of 10,999 g of water and 6,001 g of acetonitrile and further adjusting the pH to 6.0 with a 30% aqueous solution of sodium hydroxide.

Eluent flow rate; 0.8 ml/min

Column temperature: 35° C.

Column: Tohso TSKgel Guard Column SWXL+ G4000SWXL+G3000SWXL+G2000SWXL

Standard substances: Polyethylene glycol species, weight average molecular weight (Mw): 272,500, 219,300, 85,000, 46,000, 24,000, 12,600, 4,250, 7,100, 1,470

The admixture for a cementitious composition of the present invention may further contain, in addition to the constituents mentioned above, one or more of such additives as conventional cement dispersants, water-soluble polymers, air-entraining agents, cement wetting agents, expansive additives, waterproof agents, retarders, quick setting agents, water-soluble polymers, thickening agents, flocculants, drying shrinkage reducing agents, reinforcing agents and accelerators, without the admixture for a cementitious composition of the present invention being restricted in any way.

The admixture for a cementitious composition of the present invention can be used as an admixture in various hydraulic setting materials, namely cement, gypsum and like hydraulic setting materials. A cement composition comprising the admixture for a cementitious composition of the invention, cement and water is excellent in water-reducing capacity and workability, gives hardened products excellent in strength and durability, and can stably maintain the amount of air entrained without allowing increases in the amount of air even when the time of kneading is prolonged in the production. Such cement composition constitutes a further aspect of the present invention.

A cement composition comprising an admixture for a cementitious composition, cement and water in which percentage of increase in an amount of air entrained after 10 minutes of kneading is not more than 100% relative to an initial amount of air entrained is particularly effective since it can stably maintain the amount entrained air to give hardened products excellent in strength and durability. It is suited for use in cases where the addition of an AE agent is essential to cope with the freeze-thaw related problems and kneading is continued for a long period of time during transportation. It can thus contribute to solve the problem of increase in the amount of air entrained. Such cement composition constitutes a further aspect of the present invention. Preferably, the above percentage of increase in the amount of air entrained is not more than 100%, more preferably not more than 80%, still more preferably not more than 60%. Further, the percentage of increase in the amount of air entrained after 15 minutes of kneading is preferably within the above range.

In the above cement composition, the admixture for a cementitious composition preferably comprises the above water-soluble polymer (C) and/or a compound or polymer having antifoaming properties. Preferably, the compound or polymer having antifoaming properties comprises the above-mentioned compound (A) and/or the above-mentioned antifoaming agent (B). When the admixture comprises the above-mentioned water-soluble polymer (C) as well as the compound (A) and/or the above-mentioned antifoaming agent (B), it becomes easy to prepare cement compositions so that the above-mentioned requirement concerning the above percentage of increase in the amount of air entrained may be satisfied; the effects of the present invention are thus fully produced. Preferred embodiments of the above water-soluble polymer (C) as well as the compound (A) and/or the above antifoaming agent (B) are the same as those mentioned hereinabove.

In cases where good quality air is introduced to improve the freeze-thaw resistance, it is preferred that the above cement composition further contains an AE agent. In this case, even when the cement composition is used with a prolonged time of kneading in the production thereof, namely when kneading is continued during transportation of the cement composition, the above cement composition can stably maintain the amount of air entrained to give hardened products excellent in freeze-thaw resistance as well as in strength and durability.

In respect to the above cement composition, the following method is suitable as the method of measuring the above percentage of increase in the amount of air entrained.
(Measurement Method of Percentage of Increase in the Amount of Air Entrained)

Mixer to be used: Dalton's universal mixer ("15AM-rr-Standard type, trademark), agitating blade ("Beater SCS-13", trademark)

Mortar composition (kg/m$^3$): As shown below in Table 1.

TABLE 1

| Air | Water | Cement | Sand | W/C | S/C |
|---|---|---|---|---|---|
| 45 | 246 | 535 | 1419 | 46.0 | 2.65 |

In the above table, the cement is ordinary portland cement produced by Taiheiyo Cement, and the sand is river sand from the Ohi-gawa River (FM value 2.71). W/C indicates the number of weight parts of water relative to 100 parts by weight of the cement solids, and S/C indicates the number of weight parts of sand relative to 100 parts by weight of cement solids. The sample, namely admixture for a cementitious composition, can take a form containing a water-soluble polymer, a form containing a water-soluble polymer and a substance having antifoaming properties, or a form containing a water-soluble polymer, a substance having antifoaming properties and an AE agent, for instance, and the evaluation is made according to such respective forms. According to the present invention, the problem about the increase in the amount of air entrained can be solved by formulating the admixture so that percentage of increase in the amount of air entrained after 10 minutes of kneading may fall within the above-specified range even when it has a form containing an AE agent. When the AE agent is included in the evaluation, Micro-Air (trademark) produced by Master Builders or Vinsol (trademark) produced by Yamaso Kagaku is suitably used as the AE agent.

Measurement Method (1) Cement (1,605 g) is placed in a mixer, and dry mixing is carried out for 30 seconds.
(2) Water (691.5 g) containing the admixture for a cementitious composition (the AE agent, when to be contained, being excluded) (water alone amounting to 95% of the required amount) is added, and kneading is carried out for 30 seconds.
(3) Sand (4,268 g) and 36.4 g of water containing the AE agent (water alone amounting to 5% of the required amount) are added, and kneading is carried out for 120 seconds.
(4) The amount of air is measured using a mortar air meter [product of Maruto Seisakusho; mortar air meter C13S (trademark)] and this is recorded as the initial amount of air entrained (P).
(5) The mortar is further kneaded for 5 minutes and the amount of air is then measured by the method mentioned above under (4), and this is recorded as the amount of air entrained (Q) after 10 minutes of kneading.

The above percentage of increase in the amount of air entrained can be calculated by the relation $\{(Q-P)/P\} \times 100$.

The cement composition of the present invention is a hydraulic setting composition containing the admixture for a cementitious composition of the invention, a hydraulic setting material and water, if necessary further containing a fine aggregate (e.g. sand) or a coarse aggregate (e.g. crushed stone). As specific examples thereof, there may be mentioned such cement compositions as cement paste, mortar, concrete and plaster. Most generally, cement is used as the hydraulic setting material in the above cement compositions and the compositions comprise at least the admixture for a cementitious composition of the present invention, cement and water. No particular restriction is imposed on the cement species to be used. Thus, mention may be made of, for example, portland cement (ordinary, high-early-strength, ultra high-early-strength, moderate heat, sulfate resisting, and respective low alkali counterparts thereof), various kinds of mixed cement (portland blast-furnace slag cement, portland pozzolan cement, portland fly-ash cement), white portland cement, high alumina cement, ultra rapid hardening cement (1-clinker rapid hardening cement, 2-clinker rapid hardening cement, magnesium phosphate cement), grouting cement, oil-well cement, low-heat cement (low-heat blast-furnace slag cement, portland fly ash-mixed low-heat blast-furnace slag cement, high belite cement), ultra-high strength cement, cement-based solidifying agents, and eco cement (cement produced by using at least one species of municipal refuse incineration ash and sewage water sludge incineration ash as a raw material) and, further, blast-furnace slag, fly-ash, cinder ash, clinker ash, husk ash, silica fume, silica powders, limestone powers and like fine powders or gypsum may be added thereto. Usable as aggregates are gravel, crushed stone, water granulated iron-blast-furnace slag and recycled concrete aggregates and, further, silica stone materials, clay materials, zircon materials, high alumina materials, silicon carbide materials, graphite materials, chrome materials, chrome-magnesite materials, magnesia materials and like fire resistant aggregates.

In the cement composition of the present invention, the unit water content in each cubic meter ($m^3$), the amount of cement to be used or the water/cement ratio is not particularly restricted. For example, unit water content of 100 to 185 $kg/m^3$, the amount of cement to be used of 250 to 800 $kg/m^3$, and water/cement ratio (by weight) =0.1 to 0.7 are preferred. More preferred are unit water content 120 to 175 $kg/m^3$, the amount of cement used of 270 to 800 $kg/m^3$, and water/cement ratio (by weight)=0.2 to 0.65. Thus, a wide range of compositions, from lean mixtures to rich mixtures, can be formulated, and the compositions are effective in producing high strength concrete in which the unit cement content is high as well as lean concrete in which the unit cement content is not more than 300 $kg/m^3$.

The level of addition of the admixture for a cementitious composition of the present invention in the cement composition of the present invention is not particularly restricted. In cases where the admixture for a cementitious composition is used in mortar or concrete in which hydraulic cement is used, the proportion is preferably 0.01 to 5.0% by weight, more preferably 0.02 to 2.0% by weight, still more preferably 0.05 to 1.0% by weight, relative to the weight of cement and, thus, the admixture is added in an amount sufficient to attain such a proportion. By this addition, various favorable effects are produced, for example the unit water content can be reduced, the strength increased and the durability improved. When the formulating proportion is lower than 0.01% by weight, insufficient performance characteristics may result. Even when the admixture is used such high amounts as exceeding 5.0% by weight, the effects are already substantially at peak and an economic disadvantage may rather be entailed. The admixture for a cementitious composition of the present invention is also effective in concrete for secondary concrete products, concrete for centrifugal molding, concrete for vibrating compacting, steam curing concrete, shotcrete and the like and, further, in those kinds of mortar or concrete which are required to have high fluidity, such as superplasticized concrete, self-filling concrete, and self-leveling materials.

The cement composition of the invention can be produced by a method of producing cement compositions which comprises a step of admixing production raw materials comprising the admixture for a cementitious composition of the invention, cement and water. Such method of producing the cement composition also constitutes a preferred aspect of the present invention.

In the above method of producing the cement composition, the admixture for a cementitious composition of the invention is prepared and dissolved in mixing water necessary for the production of the cement composition and the solution is admixed with cement. Alternatively, the admixture for a cementitious composition of the invention, in the form of a powder, may be incorporated in advance in cement. Further, without preparing any admixture for a cementitious composition in advance, the constituents of the admixture for a cementitious composition of the invention are dissolved individually in mixing water necessary for the production of cement compositions and the solution(s) is then admixed with cement. In this case, the above water-soluble polymer (C) may be first admixed with water, followed by admixing with the above-mentioned cement additive and/or the above-mentioned antifoaming agent, or the cement additive and/or antifoaming agent may be first admixed with water, followed by admixing with the above water-soluble polymer (C). Furthermore, the above water-soluble polymer (C) and the oxyalkylene antifoaming agent of the invention may be incorporated, each in a separate powder form, in cement in advance. Thus, in the above method of producing the cement composition, the procedure for addition of the respective production raw materials or the order of addition thereof is not particularly restricted provided that the step of admixing all the constituents of the admixture for a cementitious composition of the invention with these production raw materials in such proportions that cement and water be the constituents of the cement composition.

BEST MODES FOR CARRYING OUT THE INVENTION

Figure 1:
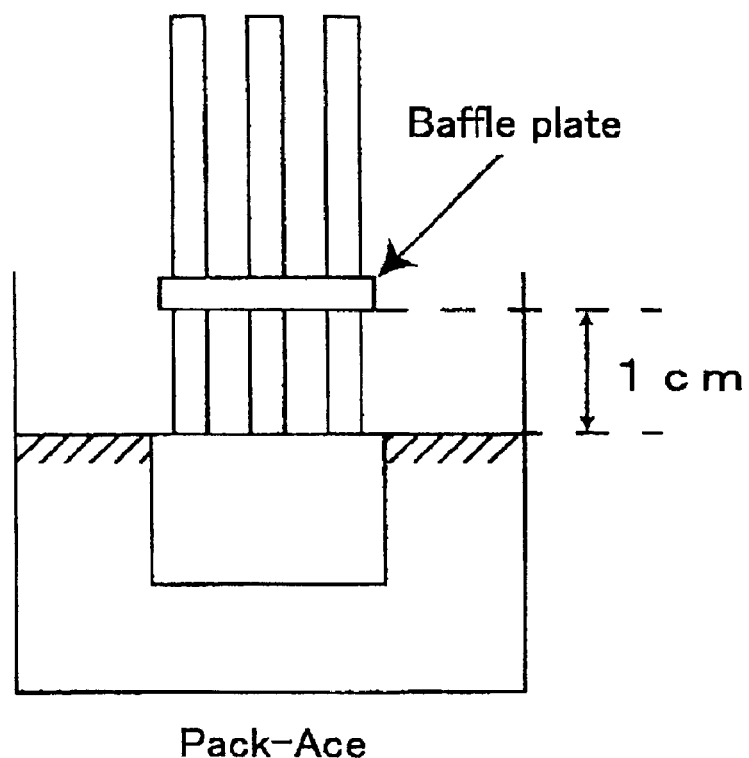
FIG. 1 is a representation of the method of disposing a homomixer in an aqueous medium solution in carrying out foaming index measurements.

The following examples illustrate the present invention in further detail. These examples are, however, by no means limitative of the scope of the present invention. Unless otherwise specified, "part(s)" means "part(s) by weight". The "%" in the amount of air means "% by volume", and "%" in other contexts means "% by weight" unless otherwise specified.

PRODUCTION EXAMPLE 1

A glass reaction vessel equipped with a thermometer, stirrer, dropping funnel, nitrogen inlet tube and reflux condenser was charged with 339.6 g of water, the reaction vessel was purged with nitrogen with stirring, and the charge was heated to 80° C. in a nitrogen atmosphere. Then, an aqueous mixed monomer solution (503.5 g) prepared by mixing up 333.6 g of methoxypolyethylene glycol monomethacrylate (average molar number of addition of ethylene oxide: 25), 66.4 g of methacrylic acid, 100 g of water and 3.5 g of 3-mercaptopropionic acid as chain transfer agent, was added dropwise over 4 hours and 46 g of an aqueous solution containing 4.6 g of ammonium peroxodisulfate was added dropwise over 5 hours. Then, the temperature was further maintained at 80° C. for 1 hour to thereby drive the polymerization reaction to completion, whereby a copolymer (1) according to the invention was obtained in the form of an aqueous medium solution of a copolymer having a weight average molecular weight of 23,800.

PRODUCTION EXAMPLE 2

A glass reaction vessel equipped with a thermometer, stirrer and reflux condenser was charged with 150 g of octyloxypolypropylene-polyethylene glycol (average molar number of addition of propylene oxide: 20; average molar number of addition of ethylene oxide: 3), 10.6 g of maleic anhydride and 1.4 g of 1,8-diazabicyclo[5.4.0]undecene-7 (DBU), and the contents were heated to 60° C. Then, the temperature was further maintained at 60° C. for 4 hours to drive the esterification reaction to completion to give a half esterification product (1) according to the invention.

PRODUCTION EXAMPLE 3

A glass reaction vessel equipped with a stirrer was charged with a tetrahydrofuran solution (25.2 g) containing 10 g of octadecyloxypolypropylene-polyethylene glycol (average molar number of addition of propylene oxide: 30; average molar number of addition of ethylene oxide: 5), 0.12 g of sodium hydride was then added, and the mixture was stirred at room temperature for 1 hour with stirring, followed by addition of a tetrahydrofuran solution (12.5 g) containing 1.2 g of maleic anhydride. The mixture was further stirred at room temperature for 2 hours to drive the esterification reaction to completion. The tetrahydrofuran was then distilled off and, after water substitution, a half esterification product (2) according to the invention was obtained.

PRODUCTION EXAMPLE 4

A glass reaction vessel equipped with a stirrer was charged with a tetrahydrofuran solution (25.3 g) containing 10 g of octyloxypolypropylene-polyethylene glycol (average molar number of addition of propylene oxide: 20; average molar number of addition of ethylene oxide: 3), 0.13 g of sodium hydride was then added, and the mixture was stirred at room temperature for 1 hour with stirring, followed by addition of a tetrahydrofuran solution (12.4 g) containing 1.2 g of succinic anhydride. The mixture was further stirred at room temperature for 2 hours to drive the esterification reaction to completion. The tetrahydrofuran was then distilled off and, after water substitution and neutralization, a half esterification product (3) according to the invention was obtained.

Then, using the copolymer (1) of the invention and the half esterification products (1) to (3), admixtures for a cementitious composition (1) to (3) and a comparative admixture for a cementitious composition (1) were prepared. The details are summarized in Table 2.

tion Examples according to the present invention or the comparative admixture for a cementitious composition, and the flow value and amount of air were measured. The materials used and the mortar formulation were as follows: Taiheiyo ordinary portland cement (1,590 g), fine aggregate (4,300 g, land sand from the Ohi-gawa River), water (684.3 g) containing the admixture for a cementitious composition of the invention or comparative admixture for a cementitious composition, and water (36 g) containing an AE agent ("Micro-Air", trademark, product of Master Builders), being used.

<Method of Mortar Testing>

For preparing each mortar composition under the above conditions, cement was dry-mixed for 30 seconds using a mortar mixer, an aqueous dilution of the specified amount of the admixture for a cementitious composition as weighed was added, and kneading was carried out for 30 seconds to give a cement paste. The mixer was once stopped from rotating, and the kneading vessel was charged with water containing the specified amount of fine aggregate and the AE agent (in 90 seconds). The whole charge was further kneaded for 2 minutes to give a cement composition. The thus-obtained cement composition (mortar) was subjected to the following mortar flow test.

An iron-made hollow cone (hereinafter referred to as "slump cone") having an upper end inside diameter of 5 cm, a lower end inside diameter of 10 cm and a height of 15 cm as placed on a horizontal table was filled to the brim with the cement composition. The method of filling as described in JIS A 1101 (slump test of concrete) was employed. The mini slump cone filled with the mortar was lifted gently and horizontally, the major axis and minor axis of the mortar that had spread on the table were measured, and the mean value thereof was recorded as the mortar flow value. A greater value indicates a higher level of dispersing ability. The amount of air was measured using a mortar air meter. The flow value and the amount of air thus measured were recorded as flow value and the amount of air after 5 minutes of kneading.

After the measurements of the flow value and the amount of air after 5 minutes of kneading, the mortar used for the measurements was put back into the kneading vessel and then stirred again for 5 minutes. Then, the flow value and the amount of air were measured by the test methods mentioned above. The flow value and amount of air measured this time were recorded as "flow value and amount of air after 10

TABLE 2

|  | Example 1 | Example 2 | Example 3 | Compar. Ex. 1 |
| --- | --- | --- | --- | --- |
| Name | Admixture for Cement (1) | Admixture for Cement (2) | Admixture for Cement (3) | Comparative Admixture for Cement (1) |
| Cement additive A species | Copolymer (1) | Copolymer (1) | Copolymer( 1) | Copolymer (1) |
| Cement additive B species | Half esterification product (1) | Half esterification product (2) | Half esterification product (3) | C8P20E3[1] |
| Additive B/Additive A (wt. % ratio) | 15/100 | 10/100 | 15/100 | 1/100 |

[1]Octyloxypolypropylene-polyethylene glycol (average molar number of addition of propylene oxide: 20; average molar number of addition of ethylene oxide: 3)

While the 10% aqueous medium solutions of the admixtures for a cementitious composition (1) to (3) remained uniform without separation, the 10% aqueous medium solution of the comparative admixture for a cementitious composition (1) became turbid and an aggregate separated out on the liquid surface.

<Mortar Test>

Mortar was prepared by adding each of the admixture for a cementitious composition prepared in the above Producminutes of kneading". Further, the mortar used for the measurements was put back into the kneading vessel and, after 5 minutes of stirring, the flow value and amount of air were measured. The flow value and amount of air measured this time were recorded as "flow value and amount of air after 15 minutes of kneading". The flow values and amounts of air for each admixture for a cementitious composition are shown in Table 3.

TABLE 3

|  | Example 4 | Example 5 | Example 6 | Compar. Ex. 2 |
|---|---|---|---|---|
| Admixture for Cement species | Admixture for Cement (1) | Admixture for Cement (2) | Admixture for Cement (3) | Comparative Admixture for Cement (1) |
| Amount of addition (wt. %/cement) | 0.155 | 0.149 | 0.155 | 0.136 |
| Amount of addition of AE agent (wt. %/cement) | 0.03 | 0.03 | 0.03 | 0.03 |
| Flow value (mm)(upper row) Amount of air entrained (%)(lower row) |  |  |  |  |
| After 5 minutes of kneading | 191<br>11.5 | 198<br>12.0 | 210<br>9.5 | 189<br>8.5 |
| After 10 minutes of kneading | 181<br>13.0 | 198<br>15.1 | 159<br>6.9 | 175<br>18.0 |
| After 15 minutes of kneading | 181<br>15.0 | 192<br>16.6 | 133<br>7.2 | 181<br>20.9 |

As is evident from the results shown in Table 3, the comparative admixture for a cementitious composition (1) used in Comparative Example 2 gave a desired amount of air of 8.5% after 5 minutes of kneading. However, as the kneading time was prolonged to 10 minutes and 15 minutes, the amount of air increased, such as 18.0% and 20.9%, respectively. It was thus found that it was difficult to stably maintain the amount of air. On the contrary, it was found that when the admixture for a cementitious composition (1) containing the half esterification product (1) of Example 4 was used, the amount of air after 5 minutes of kneading was 11.5% and the that of after 15 minutes of kneading was 15.0%, hence the amount of air was not much increased. In Examples 5 and 6, similar results were obtained as in Example 4, and the admixtures for a cementitious composition (2) and (3) showed a good stabilizing ability in the amount of the air. These admixtures for a cementitious composition contain the cement dispersant incorporated together and therefore show good dispersing capacities.

The reason why the admixtures for a cementitious composition of the present invention showed good stabilizing effects in the amount of air is that the constituent showing antifoaming properties is half esterified with a polybasic carboxylic acid. Constituents showing antifoaming properties are very high in hydrophobicity and are readily adsorbed on cement. Thus, octyloxypolypropylenepolyethylene glycol (average molar number of addition of propylene oxide: 20; average molar number of addition of ethylene oxide: 3) used in Comparative Example 1 is adsorbed on cement in mortar and its antifoaming ability is thereby lost and, therefore, the amount of air increases with the lapse of time. On the other hand, by half esterifying such a constituent having antifoaming properties with a polybasic carboxylic acid, it is possible to improve the hydrophilicity and prevent that constituent from being adsorbed on cement. Although the half ester itself has almost no antifoaming capacity, the ester moiety is presumably hydrolyzed gradually in mortar, which is alkaline, and releases the constituent having antifoaming properties, whereby good stabilizing effects in the amount of air are produced.

In the above manner, the admixtures for a cementitious composition comprising the half esterification product derived from a constituent having antifoaming properties and a polybasic carboxylic acid as well as a cement dispersant can attain good dispersing ability and stabilizing abilities in the amount of air.

<Antifoaming Capacity Testing Method>

Water, a foaming agent and the additive to be tested were placed in a closable glass-made cylindrical vessel having a diameter of 4 cm and a height of 10 cm. After closing, the vessel was shaken up and down, at a stroke of 30 cm, 20 times in 5 seconds and then allowed to stand for 1 minute. The foam height was then measured for comparison of antifoaming capacities. A lower foam height means a higher antifoaming capacity. Antifoaming capacities were compared under acidic/neutral condition and alkaline condition. Thus, 10 g of water, 0.3 g of the polymer obtained in Production Example 1 as a foaming agent and 0.1 g of the compound of Production Example 3 were placed in a measurement vessel. The mixture was shaken under two conditions, namely pH 7 or pH 12, and then allowed to stand for 1 minute, and the foam height was measured. The foam height at pH 7 was 1.0 cm, while that at pH 12 was 0 cm.

EXAMPLES 7 TO 10 AND COMPARATIVE EXAMPLE 3

The structures of the oxyalkylene antifoaming agents used in Examples 7 to 10 are shown below. The basic structure is derived from an alcohol or water by addition of ethylene oxide and propylene oxide. Here, ethylene oxide is abbreviated as EO and propylene oxide as PO. The numbers of moles of EO and PO as indicated are average molar numbers of addition.

Antifoaming agent (1): 3-methyl-3-buten-1-ol (number of carbon atoms: 5)-EO/PO adduct (average molar numbers of addition of EO/PO=10/25)

Antifoaming agent (2): allyl alcohol (number of carbon atoms: 3)-EO/PO adduct (average molar numbers of addition of EO/PO =10/25)

Antifoaming agent (3): PO/EO/PO (average molar numbers of addition of PO/EO/PO=15/16/15)

Antifoaming agent (4): EO/PO/EO (average molar numbers of addition of EO/PO/EO=5/30/5)

Comparative antifoaming agent (1): 1-octanol (number of carbon atoms: 8)-PO/EO adduct (molar numbers of addition of PO/EO=20/3)

Then, admixtures for a cementitious composition (4) to (7) and comparative admixture for a cementitious composition (2) were prepared by mixing up the copolymer (1) mentioned above in Production Example 1 and the antifoaming agents (1) to (4) or comparative antifoaming agent (1).

<Mortar Test Method>

Mortar or cement compositions were produced under the above conditions in the same manner as the above-mentioned mortar test method, and the cement (mortar) compositions obtained were subjected to mortar flow testing in the same manner as mentioned above.

TABLE 4

|  | Example 7 | Example 8 | Example 9 | Example 10 | Compar. Ex. 3 |
|---|---|---|---|---|---|
| Name | Admixture for Cement (4) | Admixture for Cement (5) | Admixture for Cement (6) | Admixture for Cement (7) | Comparative Admixture for Cement (2) |
| Cement additive A | Coplymer (1) | Coplymer (1) | Coplymer (1) | Coplymer (1) | Coplymer (1) |
| Cement additive B | Antifoaming agent (1) | Antifoaming agent (2) | Antifoaming agent (3) | Antifoaming agent (4) | Comparative antifoaming agent (1) |
| Additive A/additive B (wt. % ratio) | 100/3 | 100/3 | 100/3 | 100/3 | 100/1 |
| Storage stability of 10 wt. % aqueous medium solution | ○ | ○ | ○ | ○ | x |

As can be seen from the results shown in Table 4, the storage stability of each of the 10% by weight aqueous medium solutions of the admixtures for a cementitious composition (4) to (7) was good. On the contrary, the 10% by weight aqueous medium solution of the comparative admixture for a cementitious composition (2) became turbid and, after several days, aggregates were separated on the liquid surface. Then, mortar tests were carried out using the admixtures for a cementitious composition of the invention and the comparative admixture for a cementitious composition.

<Mortar Test>

Mortar compositions were prepared by adding the admixtures for a cementitious composition (4) to (7) of the invention as obtained in the above Production Examples and the comparative admixture for a cementitious composition (2), respectively, and the flow values and amounts of air were measured. The materials and mortar formulation used in the tests was as follows: 1,590 g of Taiheiyo ordinary portland cement, 4,300 g of fine aggregate (land sand from the Ohi-gawa River), 720.3 g of water containing the admixture for a cementitious composition of the invention or the comparative admixture for a cementitious composition.

The flow values and amounts of air for the respective admixtures for a cementitious composition are shown in Table 5.

TABLE 5

|  | Example 11 | Example 12 | Example 13 | Example 14 | Compar. Ex. 4 |
|---|---|---|---|---|---|
| Admixture for Cement species | Admixture for Cement (4) | Admixture for Cement (5) | Admixture for Cement (6) | Admixture for Cement (7) | Comparative antifoaming agent (1) |
| Amount of addition(wt. %/cement) | 0.139 | 0.139 | 0.139 | 0.139 | 0.136 |
| Flow value (mm)(upper row) Amount of air entrained (vol. %)(lower row) |  |  |  |  |  |
| After 5 minutes of kneading | 223 2.6 | 233 2.6 | 205 2.6 | 219 2.4 | 203 2.8 |
| After 15 minutes of kneading | 167 4.0 | 159 4.2 | 152 4.4 | 162 4.1 | 183 8.7 |

1)Solid weight % relative to cement weight

As can be seen from the results shown in Table 5, the comparative admixture for a cementitious composition (2) used in Comparative Example 4 gave a sufficiently low amount of air, namely 2.8% by volume, after 5 minutes of kneading. However, the amount of air after 15 minutes of kneading was very high, namely 8.7% by volume. It was thus found that it is difficult to adjust the amount of air at a constant level using this admixture for a cementitious composition. On the contrary, with the admixture for a cementitious composition (4) used in Example 11, the amount of air after 5 minutes of kneading was sufficiently low, namely 2.6% by volume, and the amount of air after 15 minutes of kneading was 4.0% by volume. It was thus found that the amount of air was maintained at a roughly constant level. With the other admixtures for a cementitious composition (5) to (7), the similar results were obtained as with the admixture for a cementitious composition (4), and the amounts of air could be maintained at constant levels. These admixtures for a cementitious composition each was admixed with a cement dispersant and therefore showed good dispersing abilities.

The reason why the admixtures for a cementitious composition of the present invention caused no marked increases in the amount of air even when the time of kneading is prolonged and gave stable amount of air entrained is that the hydrophilicity of the antifoaming agents (1) to (4) is high.

Those antifoaming agents which have been used generally, for example the one used in Comparative Example 2, were very low in hydrophilicity and, therefore, presumably aggregate in the cement-containing aqueous medium, allowing the increase in the amount of air after 15 minutes of kneading. Further, the antifoaming agent used in Comparative Example 2, for instance, was very high in hydrophobicity and readily adsorbed on cement. Therefore, it was presumable that the antifoaming properties of the antifoaming agent weres lost and the amount of air increased.

In the above manner, the admixtures for a cementitious composition comprising the highly hydrophilic antifoaming agent and a cement dispersant can attain good water-reducing capacities and small change in the amount of air entrained with the lapse of time, namely the kneading time.

PRODUCTION EXAMPLE 5

A glass-made reaction vessel equipped with a thermrnometer, stirrer, dropping funnel, nitrogen inlet tube and reflux condenser was charged with 546 g of deionized water, 800 g of a polyalkylene glycol monoalkenyl ether monomer (hereinafter referred to as IPN-50) derived from 3-methyl-3-buten-1-ol by addition of 50 moles of ethylene oxide, and 83 g of maleic acid (hereinafter sometimes referred to as MA). After raising the temperature to 65° C., 2.4 g of a 30% aqueous solution of hydrogen peroxide was added. Thereto was.added dropwise an aqueous solution of 0.9 g of L-ascorbic acid in 39.1 g of deionized water over 1 hour. Thereafter, maturation was effected at 65° C. for 1 hour to drive the polymerization reaction to completion. This reaction mixture was adjusted to pH 8 with a 30% aqueous solution of sodium hydroxide to give an aqueous medium solution of a polycarboxylic acid. The conversion of the polyalkylene glycol monoalkenyl ether monomer was 89% and the conversion of maleic acid was 98%. The copolymer obtained was named as "copolymer (2)".

3-mercaptopropionic acid over 3 hours, and 6.99 parts of a 2.1% aqueous solution of L-ascorbic acid over 3.5 hours. Thereafter, the temperature was maintained at 65° C. for 60 minutes to drive the polymerization reaction to completion. The temperature was lowered to 50° C. or below, and the mixture was neutralized to pH 4 to 7 with 79.12 parts of a 5.0% aqueous solution of sodium hydroxide, whereby an aqueous medium solution of a polymer containing a copolymer with a weight average molecular weight of 27,000 was obtained. This copolymer was named as "copolymer (3)". The total amount of the monomers used was 59.7% by weight relative to the whole amount of the raw materials used in the polymerization. The residual amount of the unsaturated alcohol obtained by adding 50 moles of ethylene oxide to 3-methyl-3-buten-1-ol and that of acrylic acid were determined by liquid chromatography (LC) and the conversions were calculated. As a result, the polymerization rate of said unsaturated alcohol was 78.4% and the conversion of acrylic acid was 98.4%.

The structures, cloud points and kaolin turbidity values of the antifoaming agents used in the following Examples and Comparative Examples are shown in Table 6. The basic structure of the antifoaming agents is derived from an alcohol or water by addition of ethylene oxide and propylene oxide. Here, ethylene oxide is abbreviated as EO and propylene oxide as PO. The numbers of moles of EO and PO are average molar numbers of addition of EO and PO. —R—O— represents the residues of secondary alcohols containing 12 to 14 carbon atoms. Each cloud point is the value obtained by preparing a 0.5% aqueous medium solution of each antifoaming agent and following the above-mentioned cloud point measurement method. Each kaolin turbidity is the value measured by the above-mentioned kaolin turbidity measurement method.

TABLE 6

| Antifoaming agent | Structure | Cloud point (° C.) | Kaolin turbidity |
|---|---|---|---|
| Antifoaming agent(1) | $CH_2=C(CH_3)-CH_2CH_2-O-(EO)_{10}-(PO)_{25}-OH$ | 26 | 250 |
| Antifoaming agent(2) | $CH_2=CHCH_2-O-(EO)_{10}-(PO)_{25}-OH$ | 23 | 50 |
| Antifoaming agent(3) | $HO-(PO)_{15}-(EO)_{16}-(PO)_{15}-OH$ | 27 | 0 |
| Antifoaming agent(4) | $HO-(EO)_5-(PO)_{30}-(EO)_5-OH$ | 24 | 10 |
| Antifoaming agent(5) | $R-O-(EO)_7-(PO)_{8.5}-OH$ | 21 | 0 |
| Antifoaming agent(6) | $R-O-(EO)_{12}-(PO)_9-OH$ | 35 | 0 |
| Antifoaming agent(7) | $R-O-(EO)_9-(PO)_5-OH$ | 36.5 | 0 |
| Antifoaming agent(8) | $C_8H_{17}-O-(EO)_5-(PO)_5-OH$ | 12 | 0 |
| Antifoaming agent(9) | $C_8H_{17}-O-(EO)_{10}-(PO)_5-OH$ | 23 | 0 |
| Antifoaming agent(10) | $C_{12}H_{25}-N\begin{array}{l}-(EO)_{c1}-(PO)_{d1}-OH\\-(EO)_{c2}-(PO)_{d2}-OH\end{array}$ Average number of moles added: c1 + c2 = 7, d1 + d2 = 5 | 40 | 0 |
| Comparartive antifoaming agent(1) | $C_8H_{17}-O-(PO)_{20}-(EO)_3-H$ | <0° C. | 2500 |
| Comparartive antifoaming agent(2) | NMB's MicroAir 404(trademark) | <0° C. | 2000 |

PRODUCTION EXAMPLE 6

A glass-made reaction vessel equipped with a thermometer, stirrer, dropping funnel, nitrogen inlet tube and reflux condenser was charged with 72.26 parts of deionized water and 127.74 parts of an unsaturated alcohol derived from 3-methyl-3-buten-1-ol by addition of 50 moles of ethylene oxide. After raising the temperature to 65° C.; 0.38 part of a 30% aqueous solution of hydrogen peroxide was added, and 19.83 parts of a 40% aqueous solution of acrylic acid was added dropwise over 3 hours, 0.35 part of admixtures for a cementitious composition were prepared using the dispersants and antifoaming agents shown in Table 7. The dispersion indices, cloud points, foaming indices 1 and foaming indices 2 of the admixtures for a cementitious composition obtained are shown in Table 7. The dispersion indices were measured by the above-mentioned dispersion index measurement method. For cloud point measurements, 20% by weight aqueous medium solutions of the admixtures for a cementitious composition were prepared and the values shown were measured by the above-mentioned cloud point measurement method. The foaming indices 1 and foaming indices 2 are the values measured by the above-mentioned foaming index measurement method.

<Mortar Test Method>

(1) Cement (1,605 g) was placed in a mixer/agitator and dry mixing was carried out for 30 seconds.

TABLE 7

|  | Example 15 | Example 16 | Example 17 | Example 18 | Example 19 | Example 20 | Example 21 | Example 22 |
|---|---|---|---|---|---|---|---|---|
| Dispersant | Copolymer (1) | Copolymer (1) | Copolymer (1) | Copolymer (1) | Copolymer (1) | Copolymer (1) | Copolymer (1) | Copolymer (1) |
| Antifoaming agent | Antifoaming agent(1) | Antifoaming agent(3) | Antifoaming agent(7) | Antifoaming agent(7) | Antifoaming agent(7) | Antifoaming agent(6) | Antifoaming agent(8) | Antifoaming agent(9) |
| Amount of addition(wt. %) | 3 | 3 | 3 | 3 | 3 | 3 | 3 | 3 |
| Dispersion index | 45 | 50 | 40 | 230 | 170 | 45 | 40 | 50 |
| Cloud point(° C.) (20 wt. %) | 20 | 28 | 15 | 21 | 18 | 15 | 15 | 26 |
| Foam height (mm) |  |  |  |  |  |  |  |  |
| Aqueous medium solution After 30 sec. | 38 | 38 | 38 | 37 | 43 | 35 | 44 | 38 |
| $CaCl_2$-containing aqueous medium solution After 30 sec. | 7 | 10 | 6 | 3 | 6 | 10 | 5 | 10 |
| $CaCl_2$-containing aqueous medium solution After 5 min. | 0 | 0 | 0 | 0 | 0 | 0 | 0 | 0 |
| Foaming index 1 | 18 | 26 | 16 | 8 | 14 | 29 | 11 | 26 |
| Foaming index 2 | 100 | 100 | 100 | 100 | 100 | 100 | 100 | 100 |

|  | Example 23 | Compar. Ex. 5 | Compar. Ex. 6 | Compar. Ex. 7 | Compar. Ex. 8 | Compar. Ex. 9 | Compar. Ex. 10 | Compar. Ex. 11 |
|---|---|---|---|---|---|---|---|---|
| Dispersant | Copolymer (1) | Copolymer (1) | Copolymer (3) | Copolymer (2) | Copolymer (1) | Copolymer (1) | HP-11[*1)] | HP-8[*1)] |
| Antifoaming agent | Antifoaming agent(10) | — | — | — | Compar. antifoaming agent(1) | Compar. antifoaming agent(2) | — | — |
| Amount of addition(wt. %) | 3 | — | — | — | 1 | 1 | — | — |
| Dispersion index | 45 | 40 | 200 | 150 | 45 | 40 | 105 | 120 |
| Cloud point(° C.) (20 wt. %) | 40 | — | — | — | <0° C. | <0° C. | 32 | 32 |
| Foam height (mm) |  |  |  |  |  |  |  |  |
| Aqueous medium solution After 30 sec. | 35 | 32 | 34 | 37 | 20 | 29 | 35 | 35 |
| $CaCl_2$-containing aqueous medium solution After 30 sec. | 9 | 33 | 40 | 38 | 21 | 35 | 17 | 17 |
| $CaCl_2$-containing aqueous medium solution After 5 min. | 0 | 30 | 33 | 31 | 10 | 21 | 10 | 15 |
| Foaming index 1 | 26 | 103 | 118 | 89 | 105 | 121 | 48 | 49 |
| Foaming index 2 | 100 | 9 | 18 | 18 | 52 | 40 | 41 | 12 |

Foaming index 1: (Foam height on $CaCl_2$-containing aqueous medium solution)/(foam height on aqueous medium solution)
Foaming index 2: Degree of disappearance of foam on $CaCl_2$-containing aqueous medium solution after 5 minutes: the extent of decrease in the amount of foam after 5 minutes as compared with the condition after 30 seconds.
*[1)]Takemoto Yushi's air-entraining and high-range water-reducing admixture Explanations are made of the data in Table 7 in the following. The amount of addition (% by weight) is the amount of addition (parts by weight) of the antifoaming agent relative to 100 parts by weight of the cement solid. The cloud point (° C.) (20% by weight) is the cloud point of a 20% by weight aqueous medium solution of the admixture for a cementitious composition. HP-11 and HP-8 are trademarks for Takemoto Yushi's air-entraining and high-range water-reducing admixtures.

<Mortar Test>

Mortar compositions were prepared by adding the water-reducing agents and antifoaming agents shown in Table 8 and Table 9 and the flow values and amounts of air were measured. The materials and mortar formulation and measuring apparatus are the same as those mentioned above referring to the measurement method of percentage of increase in the amount of air entrained.

(2) Water (691.5 g; water alone amounting to 95% of the required amount) containing the water-reducing agent and antifoaming agent was added, and kneading was carried out for 30 seconds.

(3) Sand (4,268 g) and 36.4 g of water (water alone amounting to 5% of the required amount) containing the AE agent was added, and kneading was carried out for 120 seconds.

(4) A mini slump cone (slump cone described in JIS A 1173) was filled with two layers of the mortar prepared. Each layer was pounded with a packing rod 15 times until the tip of the packing rod entered to a half of the depth of that layer and, finally, the deficiency was supplied and the layer surface was smoothened. Immediately thereafter, the mini slump cone was lifted vertically and the diameter, judged to be the maximum, of the mortar that had spread and the distance perpendicular to the direction of the maximum diameter were measured, and the mean value thereof was recorded as "mortar flow value". The amount of air was measured using a mortar air meter [product of Maruto Seisakusho: Mortar Air Meter C13S (trademark)].

(5) The mortar was further kneaded for 5 minutes, and the mortar flow value and amount of air were measured by the methods mentioned above under (4) (amount of air (P) after 5 minutes of kneading).

(6) The mortar was further kneaded for 5 minutes, and the mortar flow value and amount of air were measured by the methods mentioned above under (4) (amount of air after 10 minutes of kneading).

(7) The mortar was further kneaded for 5 minutes, and the mortar flow value and amount of air were measured by the methods mentioned above under (4) (amount of air (Q) after 15 minutes of kneading).

The increase (% by volume) in amount of air entrained was calculated as (Q–P).

TABLE 8

|  | Example24 | | | Example25 | | | Example26 | | | Example27 | | | Example28 | | |
| --- | --- | --- | --- | --- | --- | --- | --- | --- | --- | --- | --- | --- | --- | --- | --- |
| Water reducing agent | Copolymer(1) | | | Copolymer(1) | | | Copolymer(1) | | | Copolymer(1) | | | Copolymer(1) | | |
| Amount of addition (wt. %/C.) | 0.135 | | | 0.135 | | | 0.135 | | | 0.135 | | | 0.135 | | |
| AE agent | *1 | | | *1 | | | *1 | | | *1 | | | *2 | | |
| Amount of addition (wt. %/C.) | 0.03 | | | 0.03 | | | 0.03 | | | 0.05 | | | 0.08 | | |
| Antifoaming agent | Antifoaming agent(5) | | | Antifoaming agent(6) | | | Antifoaming agent(7) | | | Antifoaming agent(7) | | | Antifoaming agent(7) | | |
| Amount of addition (wt. %/water reducing agent * solid) | 6.0 | | | 6.0 | | | 6.0 | | | 6.0 | | | 6.0 | | |
| Stirring time(min.) | 5 | 10 | 15 | 5 | 10 | 15 | 5 | 10 | 15 | 5 | 10 | 15 | 5 | 10 | 15 |
| Flow value (mm) | 207 | | | 224 | | | 228 | | | 225 | | | 193 | | |
| Amount of air(vol. %) | 4.5 | 5.9 | 8.3 | 8.1 | 9.0 | 10.7 | 7.4 | 8.0 | 9.3 | 9.4 | 10.0 | 11.6 | 9.9 | 10.5 | 12.0 |
| Increase (15 min.–5 min.) | | 3.8 | | | 2.6 | | | 1.9 | | | 2.2 | | | 2.1 | |

|  | Example29 | | | Example30 | | | Example31 | | | Example32 | | |
| --- | --- | --- | --- | --- | --- | --- | --- | --- | --- | --- | --- | --- |
| Water reducing agent | Copolymer(1) | | | Copolymer(1) | | | Copolymer(1) | | | Copolymer(1) | | |
| Amount of addition (wt. %/C.) | 0.135 | | | 0.135 | | | 0.135 | | | 0.135 | | |
| AE agent | *2 | | | *2 | | | *2 | | | *1 | | |
| Amount of addition (wt. %/C.) | 0.08 | | | 0.08 | | | 0.08 | | | 0.08 | | |
| Antifoaming agent | Antifoaming agent(7) | | | Antifoaming agent(5) | | | Antifoaming agent(6) | | | Antifoaming agent(1) | | |
| Amount of addition (wt. %/water reducing agent * solid) | 6.0 | | | 6.0 | | | 6.0 | | | 3.0 | | |
| Stirring time(min.) | 5 | 10 | 15 | 5 | 10 | 15 | 5 | 10 | 15 | 5 | 10 | 15 |
| Flow value (mm) | 205 | | | 200 | | | 210 | | | 180 | | |
| Amount of air(vol. %) | 14.3 | 13.0 | 14.5 | 8.5 | 9.2 | 11.3 | 9.1 | 10.2 | 12.4 | 11.2 | 13.2 | 15.0 |
| Increase (15 min.–5 min.) | | 0.2 | | | 2.8 | | | 3.3 | | | 3.8 | |

*1)Master Bilders' Micro-Air (trademark)
*2)Yamaso Kagaku's Vinsol

TABLE 9

|  | Example33 | Example34 | Example35 | Compar. Ex.12 | Compar. Ex.13 |
| --- | --- | --- | --- | --- | --- |
| Water reducing agent | Copolymer(1) | Copolymer(1) | Copolymer(1) | Copolymer(1) | Copolymer(1) |
| Amount of addition(wt. %/C.) | 0.135 | 0.135 | 0.135 | 0.135 | 0.135 |

TABLE 9-continued

|  | Example 33 | | | Example 34 | | | Example 35 | | | Compar. Ex.12 | | | Compar. Ex.13 | | |
|---|---|---|---|---|---|---|---|---|---|---|---|---|---|---|---|
| AE agent | *1 | | | *1 | | | *1 | | | *1 | | | *2 | | |
| Amount of addition(wt. %/C.) | 0.03 | | | 0.03 | | | 0.03 | | | 0.03 | | | 0.08 | | |
| Antifoaming agent | Antifoaming agent(2) | | | Antifoaming agent(3) | | | Antifoaming agent(10) | | | Comparative antifoaming agent(1) | | | Comparative antifoaming agent(1) | | |
| Amount of addition(wt. %/water reducing agent * solid) | 3.0 | | | 3.0 | | | 4.5 | | | 1.2 | | | 1.2 | | |
| Stirring time(min.) | 5 | 10 | 15 | 5 | 10 | 15 | 5 | 10 | 15 | 5 | 10 | 15 | 5 | 10 | 15 |
| Flow value(mm) | 186 | | | 200 | | | 234 | | | 188 | | | 161 | | |
| Amount of air(vol. %) | 11.4 | 13.2 | 16.0 | 10.5 | 14.5 | 16.0 | 11.5 | 12.9 | 15.2 | 9.9 | 18.2 | 22.5 | 10.0 | 19.2 | 26.0 |
| Increase (15 min.–5 min.) | 4.6 | | | 5.5 | | | 3.7 | | | 12.6 | | | 16 | | |

*1)Master Bilders' Micro-Air (trademark)
*2)Yamaso Kagaku's Vinsol

Explanations are made of Table 8 and Table 9 in the following. The amount of addition (weight %/C) means the amount of addition (parts by weight) relative to 100 parts by weight of cement solids. The increase (15 minutes–5 minutes) means the increase (% by volume) in amount of air entrained during 10 minutes (between values after 5 minutes and 15 minutes of stirring).

From Table 8 and Table 9, it is evident that when the antifoaming agents according to the present invention were used, the increases in amount of air entrained as compared between the values after 5 minutes and the values after 15 minutes were 0.2 to 5.5%, hence the amount of air entrained could be prevented from increasing whereas when the comparative antifoaming agents were used, the increases in amount of air entrained between the values after 5 minutes and the values after 15 minutes were remarkable, namely 12.6 to 16%. The reason is presumably that the comparative antifoaming agents have very strong hydrophobicity and, therefore, the antifoaming agents undergo hydrophobic association and precipitate out during mortar kneading and thus are inactivated, namely their antifoaming capacities are lost. On the contrary, the antifoaming agents of the invention are relatively hydrophilic and therefore they are presumably resistant to hydrophobic association and precipitation during mortar kneading, hence their antifoaming capacities can be maintained.

Figure 2:
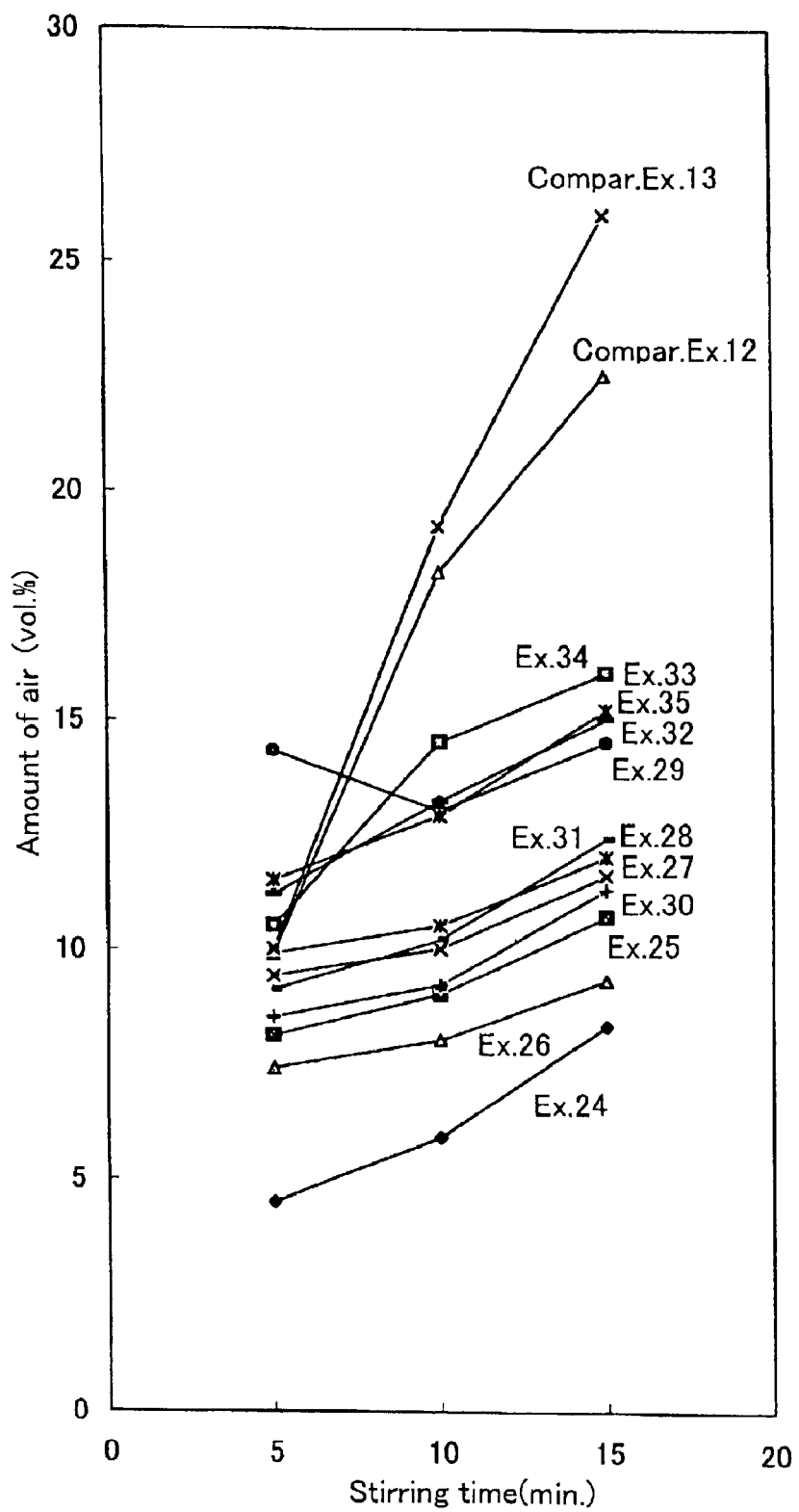
FIG. 2 is a graphic representation of the relationship between mortar kneading time (stirring time) and the amount of air entrained (amount of air: % by volume) for the mortars prepared in Examples 24 to 35 and Comparative Examples 12 and 13.

FIG. 2 is a graphic representation between the mortar kneading time (stirring time) and the amount of air entrained (amount of air: % by volume) as plotted for the mortar compositions prepared in Examples 24 to 35 and Comparative Examples 12 and 13. From FIG. 2, it is seen that when the antifoaming agents of the invention were used, the amount of air entrained could be prevented from increasing even when kneading was continued but that when the comparative antifoaming agents were used, they were inactivated and the amount of air entrained increased markedly.

Industrial Applicability

The admixtures for a cementitious composition of the invention, which have the above-mentioned constitutions, can suitably be used in cement pastes, mortar, concrete and like cement compositions and can stabilize the amount of air entrained with the lapse of time and thus facilitate the quality control of cement compositions and, further, can improve the workability of cement compositions owing to their excellent dispersing capacities. The cement compositions of the invention which comprise such admixture for a cementitious composition are excellent in water-reducing ability and workability and can give hardened products excellent in strength and durability and, further, can stably maintain the amount of air entrained without allowing increases in the amount of air even when the time of kneading is prolonged in the production.

What is claimed is:

1. A cement additive comprising a compound (A) represented by the following general formula (1);

$$R^1—O—(R^2O)_n—X—R^3 \quad (1)$$

in the formula, X represents —CO— or —CH$_2$CH$_2$NHCO—, R$^1$ represents a hydrocarbon group containing 1 to 30 carbon atoms, the n R$^2$O groups may be the same or different and each represents an oxyalkylene group containing 2 to 18 carbon atoms, n represents the average molar number of addition of the oxyalkylene group and is an integer of 1 to 300 and R$^3$ represents a group having at least one carboxyl or sulfonyl group or a salt thereof.

2. The cement additive according to claim 1,
   wherein the moiety —(R$^2$O)$_n$— in said general formula (1) is composed of an oxyethylene group and an oxyalkylene group containing 3 to 18 carbon atoms.

3. The cement additive according to claim 2,
   wherein said compound (A) is represented by the following general formula (2);

$$R^1—O—((C_2H_4O)_p/(C_3H_6O)_q)—CO—R^3 \quad (2)$$

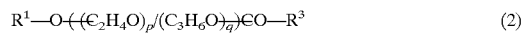

in the formula, R$^1$ represents an alkyl or alkenyl group each containing 6 to 22 carbon atoms, p and q each represents the average molar number of addition and is a number satisfying the relations 2<(p+q)<300 and 0.2<p/(p+q)<0.8 and R$^3$ represents a group having at least one carboxyl or sulfonyl group or a salt thereof.

4. The cement additive according to claim 1,
   wherein R$^3$ in said general formula (1) is a dicarboxylic acid residue.

5. The cement additive according to claim 4,
   wherein R$^3$ in said general formula (1) is represented by the following general formula (3) or the following general formula (4);

$$—CH=CH—COOY^1 \quad (3)$$

$$—CH_2—CH_2—COOY^2 \quad (4)$$

in formulae, Y$^1$ and Y$^2$ each represents a hydrogen atom, a monovalent or divalent metal, ammonium or a protonated organic amine.

6. The cement additive according to claim 1,
wherein an ester bond moiety represented by —O—X—, when X is —CO—, or an amide bond moiety in X, when X is —CH₂CH₂NHCO—, in said compound (A) is hydrolysable under alkaline condition.

7. The cement additive according to claim 1,
wherein a hydrolyzate obtainable by hydrolysis of said compound (A) under alkaline condition has a higher antifoaming capacity than the antifoaming capacity of said compound (A) itself.

8. The cement additive according to claim 1,
wherein said compound (A) itself has no antifoaming capacity, and
the hydrolyzate obtainable by hydrolysis of said compound (A) under alkaline condition has the antifoaming capacity.

9. An admixture for a cementitious composition comprising a water-soluble polymer (C) and the cement additive according to claim 1.

10. An admixture for a cementitious composition comprising a water-soluble polymer (C) and an antifoaming agent (B),
wherein said antifoaming agent (B) has a kaolin turbidity of not more than 500 mg/L as measured in a 1% by weight aqueous medium solution, a cloud point of not lower than 5° C. as measured in a 0.5% by weight aqueous medium solution and an antifoaming capacity in salt water, and
wherein the content of said antifoaming agent (B) is not more than 10 times relative to said water-soluble polymer (C) on the weight basis.

11. The admixture for a cementitious composition according to claim 10,
wherein said antifoaming agent (B) comprises an oxyalkylene antifoaming agent (B-1) represented by the following general formula (5);

(5)

in the formula, $R^4$ and $R^6$ are the same or different and each represents a hydrogen atom or a hydrocarbon group containing 1 to 30 carbon atoms, the t $R^5O$ groups are the same or different and each represents an oxyalkylene group containing 2 to 18 carbon atoms, t represents the average molar number of addition of the oxyalkylene group and is a number of 1 to 300, T represents —O—, —CO₂—, —SO₄—, —PO₄— or —NH—, m represents an integer of 1 or 2 and, when $R^4$ is a hydrogen atom, m is 1.

12. The admixture for a cementitious composition according to claim 11,
wherein the m $R^6$ groups in said general formula (5) are the same or different and each is a straight or branched alkyl group containing 3 to 30 carbon atoms.

13. The admixture for a cementitious composition according to claim 11,
wherein said oxyalkylene antifoaming agent (B-1) is represented by the following general formula (6);

(6)

in the formula, $R^7$ represents a hydrogen atom or a hydrocarbon group containing 1 to 30 carbon atoms, $R^8$ represents an oxyalkylene group containing 3 to 18 carbon atoms, r and s each represents the average molar number of addition and r and s satisfy the relations $0.2 < r/(r+s) < 0.8$ and $2 < (r+s) < 300$.

14. The admixture for a cementitious composition according to claim 13,
wherein $R^7$ in said general formula (6) is a straight or branched alkyl group containing 3 to 30 carbon atoms.

15. The admixture for a cementitious composition according to claim 10,
wherein said antifoaming agent (B) comprises an oxyalkylene antifoaming agent (B-2) having a hydrocarbon group containing 1 to 30 carbon atoms, an alkylene oxide chain composed of an oxyethylene group and an oxyalkylene group containing 3 to 18 carbon atoms and at least one nitrogen atom in the molecular thereof,
said alkylene oxide chain satisfying the relations $0.2 < u/(u+v) < 0.8$ and $2 < (u+v) < 300$ provided that u is the molar number of addition of ethylene oxide and v is the molar number of addition of alkylene oxide containing 3 or more carbon atoms.

16. An admixture for a cementitious composition comprising a water-soluble polymer (C) and water,
wherein a foam height obtainable by causing a calcium chloride-containing aqueous medium solution of said cement admixture to foam is not higher than 70% of the foam height obtainable by causing an aqueous medium solution of said cement admixture to foam,
percentage of foam height disappearance 5 minutes after causing the calcium chloride-containing aqueous medium solution of said cement admixture to foam is not less than 50%,
a cloud point of a 20% by weight aqueous medium solution of said cement admixture is not lower than 5° C., and
a viscosity of a calcium carbonate slurry prepared by adding an aqueous medium solution of said cement admixture to calcium carbonate and adjusting the content of said cement admixture to 0.2% by weight relative to calcium carbonate and the content of calcium carbonate to 70% by weight is not more than 1,000 mPa·s.

17. An admixture for a cementitious composition comprising a water-soluble polymer (C) and the cement additive,
wherein the cement additive comprising a compound (A) represented by the following general formula (1);

(1)

in the formula, X represents —CO— or —CH₂CH₂NHCO—, $R^1$ represents a hydrocarbon group containing 1 to 30 carbon atoms, the n $R^2O$ groups may be the same or different and each represents an oxyalkylene group containing 2 to 18 carbon atoms, n represents the average molar number of addition of the oxyalkylene group and is an integer of 1 to 300 and $R^3$ represents a group having at least one carboxyl or sulfonyl group or a salt thereof and said water-soluble polymer (C) comprises a polycarboxylic acid polymer (C-1) having a polyoxyalkylene ester constituent unit (I) represented by the following general formula (7);

(7)

in the formula, $R^9$ and $R^{10}$ are the same or different and each represents a hydrogen atom or a methyl group, the a $R^{11}O$ groups are the same or different and each represents an oxyalkylene group containing 2 to 18 carbon atoms, a represents the average molar number of addition of the oxyalkylene group and is a number of 2 to 300 and $R^{12}$ represents a hydrogen atom or a hydrocarbon group containing 1 to 30 carbon atoms, and a carboxylic acid constituent unit (II) represented by the following general formula (8);

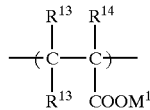 (8)

in the formula, $R^{13}$ and $R^{14}$ are the same or different and each represents a hydrogen atom or a methyl group and $M^1$ represents a hydrogen atom, a monovalent metal, a divalent metal, ammonium or a protonated organic amine.

18. The admixture for a cementitious composition according to claim 9, wherein said water-soluble polymer (C) comprises a polycarboxylic acid polymer (C-2) having a polyoxyalkylene ether constituent unit (III) represented by the following general formula (9);

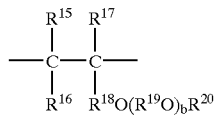 (9)

in the formula, $R^{15}$, $R^{16}$ and $R^{17}$ are the same or different and each represents a hydrogen atom or a methyl group, $R^{18}$ represents a hydrocarbon group containing 1 to 5 carbon atoms, the b $R^{19}O$ groups are the same or different and each represents an oxyalkylene group containing 2 to 18 carbon atoms, b represents the average molar number of addition of the oxyalkylene group and is a number of 2 to 300 and $R^{20}$ represents a hydrogen atom or a hydrocarbon group containing 1 to 30 carbon atoms, and a carboxylic acid constituent unit (IV) represented by the following general formula (10);

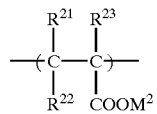 (10)

in the formula, $R^{21}$ and $R^{22}$ are the same or different and each represents a hydrogen atom, a methyl group or —$COOM^3$ provided that $R^{21}$ and $R^{22}$ do not represent —$COOM^3$ simultaneously, $R^{23}$ represents a hydrogen atom, a methyl group or —$CH_2COOM^4$, $R^{21}$ and $R^{22}$ are the same or different and each represents a hydrogen atom or a methyl group when $R^{23}$ is —$CH_2COOM^4$, $M^2$, $M^3$ and $M^4$ each represents a hydrogen atom, a monovalent metal, a divalent metal, ammonium or a protonated organic amine.

19. A cement composition comprising the admixture for a cementitious composition, cement and water, comprising a water-soluble polymer (C) and the cement additive, wherein the cement additive comprising a compound (A) represented by the following general formula (1);

 (1)

in the formula, X represents —CO— or —$CH_2CH_2NHCO$—, $R^1$ represents a hydrocarbon group containing 1 to 30 carbon atoms, the n $R^2O$ groups may be the same or different and each represents an oxylkylene goup containing 2 to 18 carbon atoms, n represents the average molar number of addition of the oxyalkylene group and is an integer of 1 to 300 and R3 represents a group having at least one carboxyl or sulfonyl group or a salt thereof.

20. A cement composition of claim 19, wherein percentage of increase in an amount of air entrained after 10 minutes of kneading in a mixer is not more than 100% relative to an initial amount of air entrained, wherein the kneading speed before measuring initial amount of air entrained is maintained until the amount of air entrained after 10 minutes of kneading is measured.

* * * * *